US012406319B2

(12) United States Patent
Otani et al.

(10) Patent No.: US 12,406,319 B2
(45) Date of Patent: Sep. 2, 2025

(54) PROGRAM, INFORMATION PROCESSING APPARATUS, AND INFORMATION PROCESSING METHOD

(71) Applicant: NEC Corporation, Tokyo (JP)

(72) Inventors: Takumi Otani, Tokyo (JP); Takeshi Sasamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/670,787

(22) Filed: May 22, 2024

(65) Prior Publication Data

US 2024/0311944 A1 Sep. 19, 2024

Related U.S. Application Data

(63) Continuation of application No. 17/771,123, filed as application No. PCT/JP2019/043740 on Nov. 7, 2019, now Pat. No. 12,045,907.

(51) Int. Cl.
*G06Q 50/40* (2024.01)
*G06Q 10/02* (2012.01)
(Continued)

(52) U.S. Cl.
CPC ............ *G06Q 50/40* (2024.01); *G06Q 10/02* (2013.01); *G07C 9/25* (2020.01); *G07C 9/27* (2020.01)

(58) Field of Classification Search
CPC .......... G06Q 50/40; G06Q 10/02; G07C 9/27; G07C 9/25
(Continued)

(56) References Cited

U.S. PATENT DOCUMENTS 8,571,902 B1 * 10/2013 Glavan ................. G06Q 50/10
705/325
9,665,998 B1 5/2017 Shields ................. G06Q 10/04
(Continued)

FOREIGN PATENT DOCUMENTS

EP 1619638 A1 1/2006
JP 2002-373217 A 12/2002
(Continued)

OTHER PUBLICATIONS

International Search Report for PCT Application No. PCT/JP2019/043740, mailed on Jan. 7, 2020.
(Continued)

*Primary Examiner* — Ahshik Kim

(57) ABSTRACT

A program in the present invention causes a computer to perform: performing a first process for performing a predetermined process related to an aircraft boarding procedure and acquiring boarding reservation information on a user; when the process is completed, performing a second process for matching biometric information acquired from the user with passport biometric information included in passport information acquired from a passport of the user and, when a result of the matching of the biometric information with the passport biometric information is that the matching is successful, associating the passport information, the biometric information, and the boarding reservation information with each other; and performing a switching process for switching whether to perform the first process or the second process.

9 Claims, 18 Drawing Sheets

(51) Int. Cl.
*G07C 9/25* (2020.01)
*G07C 9/27* (2020.01)

(58) Field of Classification Search
USPC .......................................................... 235/384
See application file for complete search history.

(56) References Cited

U.S. PATENT DOCUMENTS

| | | | |
|---|---|---|---|
| 12,045,907 B2* | 7/2024 | Otani | G07C 9/257 |
| 2002/0193973 A1 | 12/2002 | Kinoshita et al. | |
| 2013/0027187 A1 | 1/2013 | Yepez | G07C 9/27 340/10.1 |
| 2015/0039354 A1 | 2/2015 | Murphy | G06Q 10/02 705/5 |
| 2017/0046808 A1 | 2/2017 | Parrish | G06K 7/1417 |
| 2017/0262625 A1 | 9/2017 | Takeda | |
| 2019/0147558 A1 | 5/2019 | Cheikh et al. | |
| 2020/0380426 A1 | 12/2020 | Schlank | G06Q 50/265 |

FOREIGN PATENT DOCUMENTS

| | | |
|---|---|---|
| JP | 2003-296766 A | 10/2003 |
| JP | 2005-135310 A | 5/2005 |
| JP | 2017-167621 A | 9/2017 |
| JP | 2018-045340 A | 3/2018 |
| JP | 2018-190307 A | 11/2018 |
| WO | 2005/055151 A1 | 6/2005 |

OTHER PUBLICATIONS

Extended European Search Report for EP Application No. 19951940.6, dated on Oct. 11, 2022.

JP Office Action for JP Application No. 2022-024514, mailed on Feb. 9, 2023 with English Translation.

* cited by examiner

| No | ITEM NAME |
|---|---|
| 1 | TOKEN ID |
| 2 | GROUP ID |
| 3 | REGISTERED FACE IMAGE |
| 4 | FEATURE AMOUNT |
| 5 | TOKEN ISSUANCE TIME |
| 6 | TOKEN ISSUANCE DEVICE NAME |
| 7 | INVALIDATION FLAG |
| 8 | INVALIDATION TIME |

| No | ITEM NAME |
|---|---|
| 1 | PASSAGE HISTORY ID |
| 2 | TOKEN ID |
| 3 | PASSAGE TIME |
| 4 | DEVICE NAME |
| 5 | OPERATION SYSTEM TYPE |
| 6 | PASSAGE TOUCH POINT |

| No | ITEM NAME |
|---|---|
| 1 | TOKEN ID |
| 2 | PASSENGER NAME |
| 3 | RESERVATION NUMBER |
| 4 | DEPARTURE PLACE |
| 5 | DESTINATION |
| 6 | AIRLINE CODE |
| 7 | FLIGHT NUMBER |
| 8 | FLIGHT DATE |
| 9 | SEAT NUMBER |
| 10 | NATIONALITY |
| 11 | PASSPORT NUMBER |
| 12 | FAMILY NAME |
| 13 | FIRST NAME |
| 14 | DATE OF BIRTH |
| 15 | SEXUALITY |

FIG. 5

| No | ITEM NAME |
|---|---|
| 1 | RESERVATION NUMBER |
| 2 | AIRLINE CODE |
| 3 | PASSENGER NAME |
| 4 | DEPARTURE PLACE |
| 5 | DESTINATION |
| 6 | FLIGHT NUMBER |
| 7 | FLIGHT DATE |
| 8 | SEAT NUMBER |
| 9 | SEAT CLASS |
| 10 | NATIONALITY |
| 11 | PASSPORT NUMBER |
| 12 | FAMILY NAME |
| 13 | FIRST NAME |
| 14 | DATE OF BIRTH |
| 15 | SEXUALITY |

PROGRAM, INFORMATION PROCESSING APPARATUS, AND INFORMATION PROCESSING METHOD

This application is a continuation application of U.S. patent application Ser. No. 17/771,123 filed on Apr. 22, 2022, which is a National Stage Entry of PCT/JP2019/043740 filed on Nov. 7, 2019, the contents of all of which are incorporated herein by reference, in their entirety.

TECHNICAL FIELD

The present invention relates to a program, an information processing apparatus, and an information processing method.

BACKGROUND ART

Patent Literature 1 discloses a check-in system having a check-in terminal (boarding ticket vending machine) that acquires user's face data, and if a result of matching of the face data with face data separately acquired from a passport is that the matching is successful, prints a boarding ticket with user face data.

CITATION LIST

Patent Literature

PTL 1: Japanese Patent Application Laid-Open No. 2005-135310

SUMMARY OF INVENTION

Technical Problem

The check-in terminal disclosed in Patent Literature 1 is provided in advance with a face authentication function that extracts a feature part of face from image information acquired by each of a reading device and a camera to create face data and matches two face data with each other to authenticate the user. In existing airports, however, there still are a large number of check-in terminals that do not have such a face authentication function. There is a problem of significant cost being required in introducing new-model check-in terminals having a face authentication function in place of existing check-in terminals.

Accordingly, in view of the problems described above, the present invention intends to provide a program, an information processing apparatus, and an information processing method that can easily implement a face authentication function to an existing check-in terminal.

Solution to Problem

According to one aspect of the present invention, provided is a program that causes a computer to perform: performing a first process for performing a predetermined process related to an aircraft boarding procedure and acquiring boarding reservation information on a user; when the process is completed, performing a second process for matching biometric information acquired from the user with passport biometric information included in passport information acquired from a passport of the user and, when a result of the matching of the biometric information with the passport biometric information is that the matching is successful, associating the passport information, the biometric information, and the boarding reservation information with each other; and performing a switching process for switching whether to perform the first process or the second process.

According to another aspect of the present information processing invention, provided is an apparatus including: a first processing unit that performs a predetermined process related to an aircraft boarding procedure and acquires boarding reservation information on a user; a second processing unit that, when the process is completed, matches biometric information acquired from the user with passport biometric information included in passport information acquired from a passport of the user and, when a result of the matching of the biometric information with the passport biometric information is that the matching is successful, associates the passport information, the biometric information, and the boarding reservation information with each other; and a switching unit that switches whether to operate the first processing unit or the second processing unit.

According to yet another aspect of the present invention, provided is an information processing method including: performing a first process for performing a predetermined process related to an aircraft boarding procedure and acquiring boarding reservation information on a user; when the process is completed, performing a second process for matching biometric information acquired from the user with passport biometric information included in passport information acquired from a passport of the user and, when a result of the matching of the biometric information with the passport biometric information is that the matching is successful, associating the passport information, the biometric information, and the boarding reservation information with each other; and performing a switching process for switching whether to perform the first process or the second process.

Advantageous Effects of Invention

According to the present invention, it is possible to easily implement a face authentication function to an existing check-in terminal.

BRIEF DESCRIPTION OF DRAWINGS

FIG. 2 is a diagram illustrating an example of information stored in a token ID information DB in the first example embodiment.

FIG. 3 is a diagram illustrating an example of information stored in a passage history information DB in the first example embodiment.

FIG. 4 is a diagram illustrating an example of information stored in an operation information DB in the first example embodiment.

FIG. 5 is a diagram illustrating an example of information stored in a reservation information DB in the first example embodiment.

DESCRIPTION OF EMBODIMENTS

Exemplary embodiments of the present invention will be described below with reference to the drawings. Throughout the drawings, the same or corresponding components are labeled with the same references, and the description thereof may be omitted or simplified.

First Example Embodiment

Figure 1:
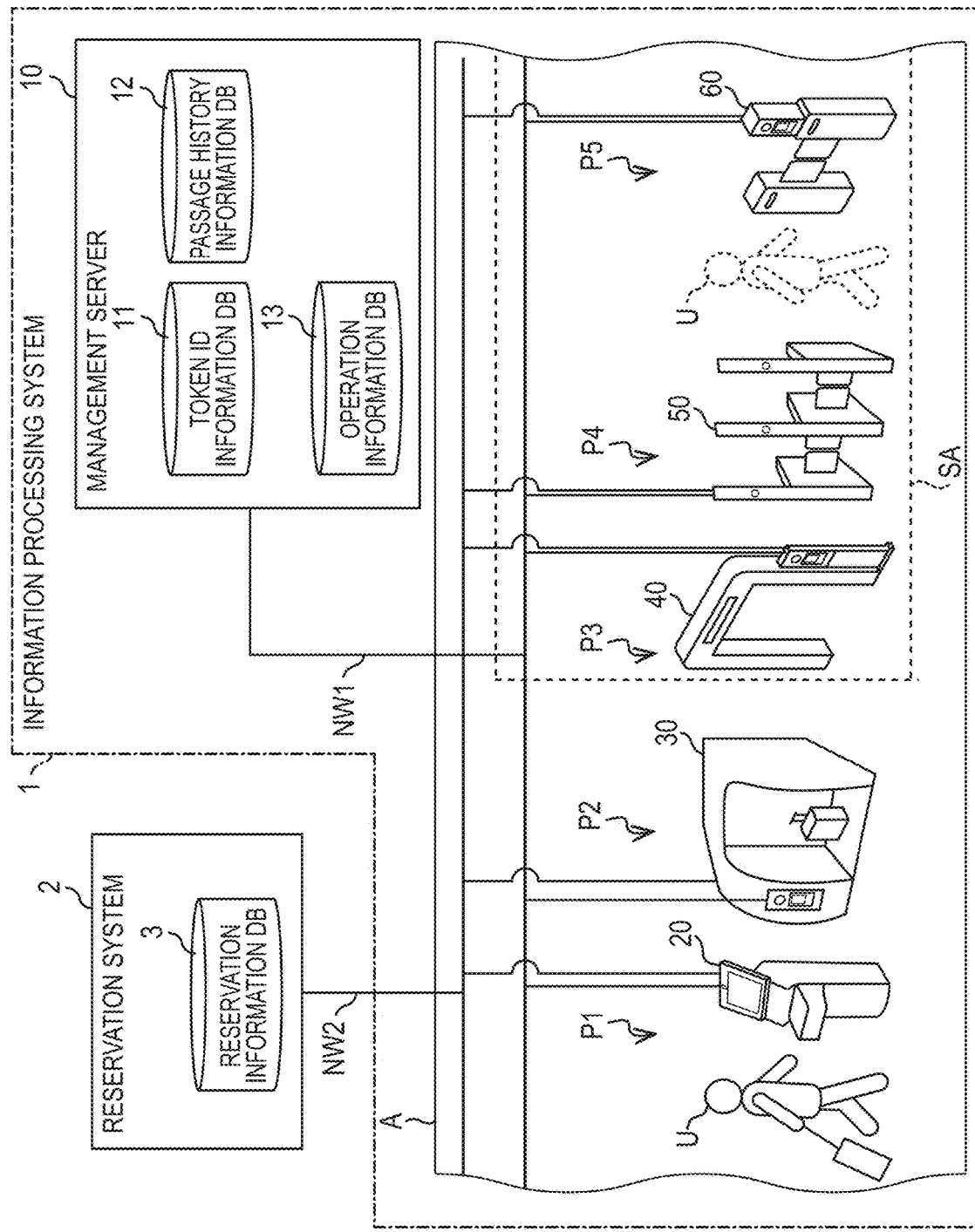
FIG. 1 is a schematic diagram illustrating an example of an overall configuration of an information processing system in a first example embodiment.

FIG. 1 is a schematic diagram illustrating an example of an overall configuration of an information processing system 1 in the present example embodiment. The information processing system 1 is a computer system that supports operations related to a series of inspection procedures performed on a user (passenger) U using an airport A. The information processing system 1 is operated by a public institution such as an immigration control bureau or a trustee entrusted with the operation from such an institution, for example.

In the information processing system 1 of the present example embodiment, a check-in terminal 20, an automatic baggage check-in machine 30, a security inspection apparatus 40, an automated gate apparatus 50, and a boarding gate apparatus 60 are connected to a shared management server 10 via a network NW1, respectively. Further, the check-in terminal 20, the automatic baggage check-in machine 30, the security inspection apparatus 40, the automated gate apparatus 50, and the boarding gate apparatus 60 are connected to a reservation system 2 of an airline company via a network NW2, respectively. The security inspection apparatus 40, the automated gate apparatus 50, and the boarding gate apparatus 60 are installed in a security area SA illustrated by a dashed line. The networks NW1 and NW2 is formed of a local area network (LAN) including a private communication network of the airport A, a wide area network (WAN), a mobile communication network, or the like. The connection scheme may be a wireless scheme without being limited to a wired scheme. Note that, for simplified illustration, FIG. 1 illustrates only terminal apparatuses (operation terminals) used for procedures for departure from a country via the airport A.

The management server 10 manages operations related to inspection procedures in immigration of the user U. The management server 10 is installed in a facility of an airport company operating the airport A, an airline company, or the like, for example. Further, the management server 10 may be a cloud server instead of a server installed in the facility in which operations are actually performed. Note that the management server 10 is not necessarily required to be a single server and may be formed as a server group including a plurality of servers.

As illustrated in FIG. 1, the inspection procedures in the airport A for departure from country are sequentially performed at five touch points P1 to P5. The relationship between each apparatus and the touch points P1 to P5 will be described below.

The check-in terminal 20 is installed in a check-in lobby (hereafter, referred to as "touch point P1") in the airport A. The check-in terminal 20 is a self-service terminal operated by the user U by himself/herself to perform a check-in procedure (boarding procedure). The check-in terminal 20 is also called a Common Use Self Service (CUSS) terminal. After completion of the check-in procedure at the touch point P1, the user U moves to a baggage check-in place or a security inspection site.

The automatic baggage check-in machine 30 is installed in a region adjacent to a baggage counter (manned counter) in the airport A or a region near the check-in terminal 20 (hereafter, referred to as "touch point P2"). The automatic baggage check-in machine 30 is a self-service terminal operated by the user U by himself/herself to perform procedure to check in baggage not carried in the aircraft (baggage check-in procedure). The automatic baggage check-in machine 30 is also called a Common Use Bag Drop (CUBD) terminal. After completion of the baggage check-in procedure, the user U moves to the security inspection site. Note that, when the user U does not check in his/her baggage, the procedure at the touch point P2 is omitted.

The security inspection apparatus 40 is installed in the security inspection site (hereafter, referred to as "touch point P3") in the airport A. The security inspection apparatus 40 is an apparatus that uses a metal detector to check whether or not the user U is wearing a metal object that may be a dangerous object. Note that the term "security inspection apparatus" in the present example embodiment is used as a meaning including not only a metal detector but also an X-ray inspection device that uses an X-ray to check whether or not there is a dangerous object in carry-on baggage or the like, a terminal device of a Passenger Reconciliation System (PRS) that determines whether or not to permit passage of the user U at the entrance of a security inspection site, or the like. After completion of the security inspection procedure with the security inspection apparatus 40 at the touch point P3, the user U moves to a departure inspection site.

The automated gate apparatus 50 is installed in the departure inspection site (hereafter, referred to as "touch point P4") in the airport A. The automated gate apparatus 50 is an apparatus that automatically performs a departure inspection procedure on the user U. After completion of the departure inspection procedure at the touch point P4, the user U moves to a departure area where duty free shops or boarding gates are provided.

The boarding gate apparatus 60 is a passage control apparatus each installed at a boarding gate (hereafter, referred to as "touch point P5") of the departure area. The boarding gate apparatus 60 is also called an Automated Boarding Gates (ABG) terminal. The boarding gate apparatus 60 confirms that the user U is a passenger of an aircraft that is available for boarding through the boarding gate. After completion of the procedure at the touch point P5, the user U boards the aircraft and departs from the country to a second country.

Further, as illustrated in FIG. 1, the management server 10 has a token ID information DB 11, a passage history information DB 12, and an operation information DB 13. Note that the database included in the management server 10 is not limited to these databases.

FIG. 2 is a diagram illustrating an example of information stored in the token ID information DB 11. The token ID information DB 11 has data items of a token ID, a group ID, a registered face image, a feature amount, a token issuance time, a token issuance device name, an invalidation flag, and an invalidation time. The token ID is an identifier that uniquely identifies ID information. The token ID in the present example embodiment is temporarily issued provided that there is a matching in a result of matching between a face image in which the user U possessing a passport is captured at the touch point P1 and a passport face image read from the passport. The token ID is then invalidated once the user U completes a procedure at the touch point P5 (boarding gate). That is, the token ID is not an identifier to be permanently used but as a one-time ID having a validated period (lifecycle).

The group ID is an identifier used for grouping ID information. The registered face image is a face image registered for the user U. The feature amount is a value extracted from biometric information (registered face image). Note that, although the term of biometric information in the present example embodiment means a face image or a feature amount extracted from a face image, biometric information is not limited to a face image or a face feature amount. That is, biometric authentication may be performed by using an iris image, a fingerprint image, a palmprint image, an auricle image, or the like as biometric information on the user U.

The token issuance time is a time that the management server 10 issued a token ID. The token issuance device name is a device name of an acquisition source of a registered face image that triggered issuance of a token ID. The invalidation flag is flag information indicating whether or not the token ID is currently valid. In response to issuance of a token ID, the invalidation flag in the present example embodiment becomes a value of "1" indicating a state where the token ID is valid. Further, if a predetermined condition is satisfied, the invalidation flag is updated to a value of "0" indicating a state where the token ID is invalid. The invalidation time is a timestamp of a time that the invalidation flag was invalidated.

FIG. 3 is a diagram illustrating an example of information stored in the passage history information DB 12. The passage history information DB 12 has data items of a passage history ID, a token ID, a passage time, a device name, an operation system type, and a passage touch point.

The passage history ID is an identifier that uniquely identifies passage history information. The passage time is a timestamp at passage of a touch point. The device name is a machine name of an operation terminal used in a procedure at a touch point. The operation system type is a type of an operation system to which an operation terminal belongs. A passage touch point is a touch point by which the user passed. Note that, by extracting passage history information on a token ID basis, the management server 10 can know up to which touch point the user U has completed procedures.

FIG. 4 is a diagram illustrating an example of information stored in the operation information DB 13. The operation information DB 13 has data items of a token ID, a passenger name, a reservation number, a departure place, a destination, an airline code, a flight number, a flight date, a seat number, a nationality, a passport number, a family name, a first name, a date of birth, and a sexuality. In such a way, the operation information DB 13 stores operation information related to predetermined operations on a token ID basis. In the present example embodiment, "predetermined operation" means a procedure operation performed at each of the touch points P1 to P5.

The reservation number is an identifier that uniquely identifies boarding reservation information. The airline code is an identifier that uniquely identifies an airline company. Boarding reservation information included in operation information may be a passenger name, a reservation number, a departure place, a destination, an airline code, a flight number, a flight date, a seat number, a nationality, a passport number, a family number, a first name, a date of birth, a sexuality, or the like. The boarding reservation information can be acquired from a recording medium such as a passport, a boarding ticket, or the like. Further, the boarding reservation information can also be acquired from a reservation system 2 of an airline company by using a passport number, a reservation number, or the like as a key. The acquired boarding reservation information is then stored as operation information in the operation information DB 13.

FIG. 5 is a diagram illustrating an example of information stored in a reservation information DB 3. The reservation information DB 3 has data items of a reservation number, an airline code, a passenger name, a departure place, a destination, a flight number, a flight date, a seat number, a seat class (for example, first class/business class/economy class), a nationality, a passport number, a family name, a first name, a date of birth, and a sexuality.

In the present example embodiment, the operation information DB 13 and the reservation information DB 3 are associated with each other by a reservation number, a passport number, and an airline code. Once reading a reservation number, a passport number, and an airline code from an airline ticket medium presented by the passenger, the terminal devices (the check-in terminal 20 or the like) at respective touch points can query the reservation system 2 of an airline company corresponding to the airline code about boarding reservation information based on the reservation number or the passport number. Note that the method of querying the reservation system 2 about boarding reservation information is not limited to the above.

Subsequently, the hardware of respective devices forming the information processing system 1 and software installed in the check-in terminal 20 will be described with reference to FIG. 6 to FIG. 12. Note that, in FIG. 6 to FIG. 12, devices having the same name but different references are devices having substantially the same function, and the detailed description thereof will thus be omitted in subsequent drawings.

Figure 6:
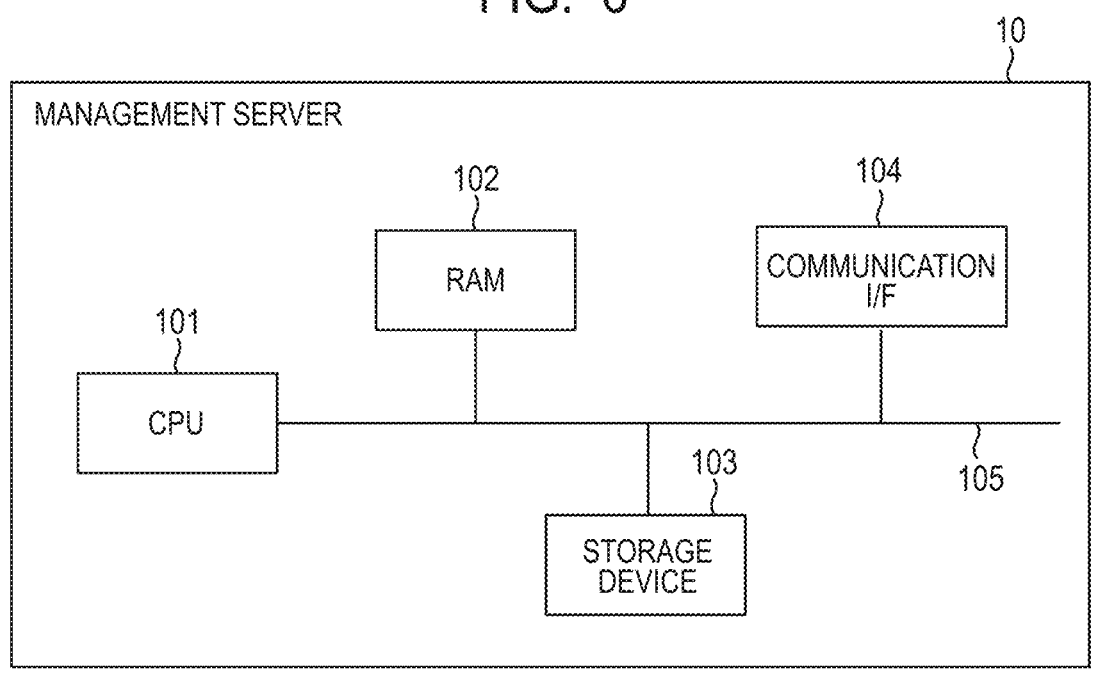
FIG. 6 is a block diagram illustrating an example of a hardware configuration of the management server in the first example embodiment.
Figure 8:
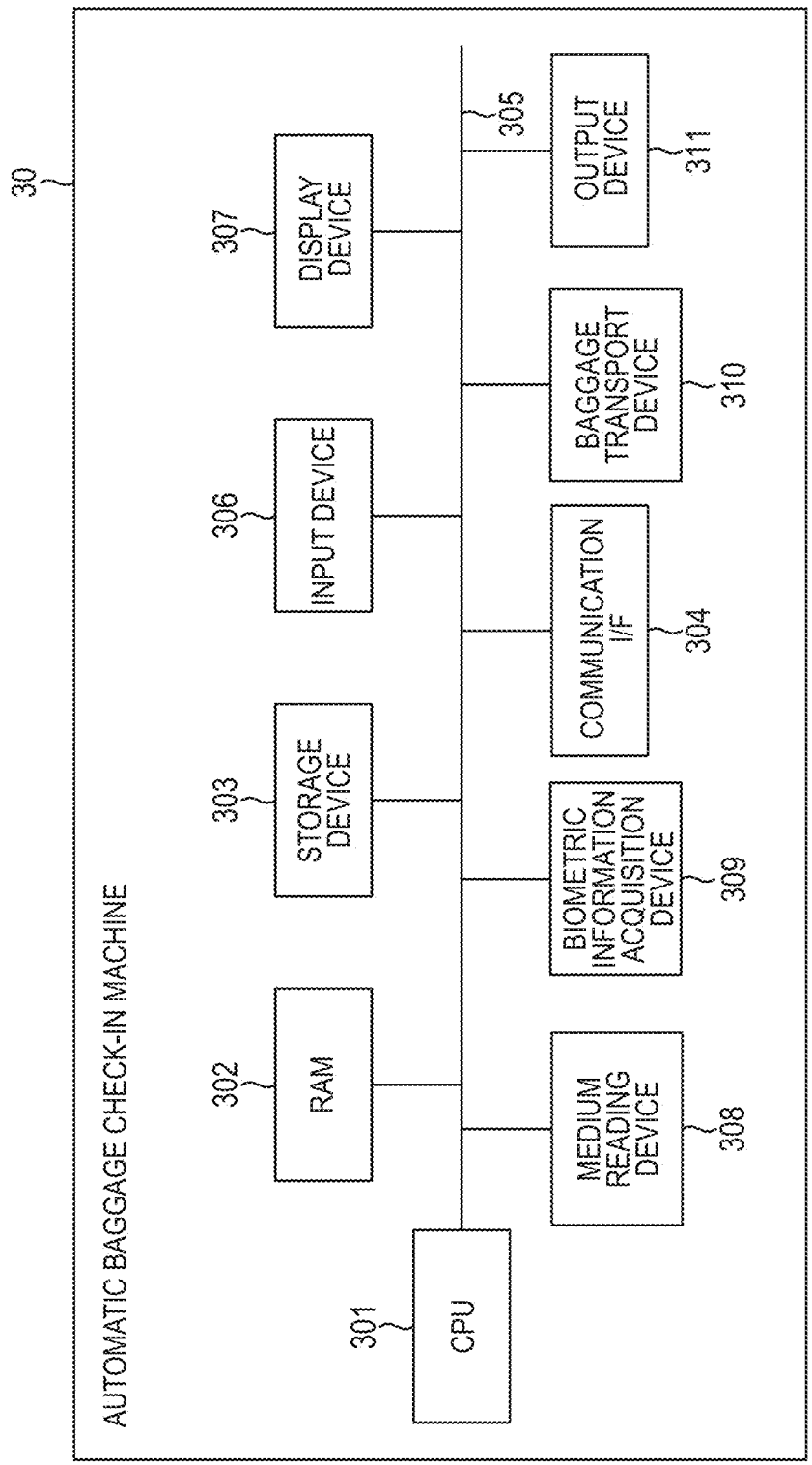
FIG. 8 is a block diagram illustrating an example of a hardware configuration of an automatic baggage check-in machine in the first example embodiment.

FIG. 6 is a block diagram illustrating an example of the hardware configuration of the management server 10. As illustrated in FIG. 8, the management server 10 has a central processing unit (CPU) 101, a random access memory (RAM) 102, a storage device 103, and a communication I/F 104. Each device is connected to a bus line 105.

The CPU 101 is a processor having a function of performing a predetermined operation in accordance with a program stored in the storage device 103 and controlling each component of the management server 10. The RAM 102 is formed of a volatile storage medium and provides a temporary memory area required for the operation of the CPU 101.

The storage device 103 is formed of a storage medium such as a nonvolatile memory, a hard disk drive, or the like. The storage device 103 stores a program executed by the CPU 101, data referenced by the CPU 101 in execution of the program, or the like.

The communication I/F 104 is a communication interface based on a specification such as Ethernet (registered trademark), Wi-Fi (registered trademark), 4G, or the like and is a module for communicating with the check-in terminal 20 or the like.

Figure 7:
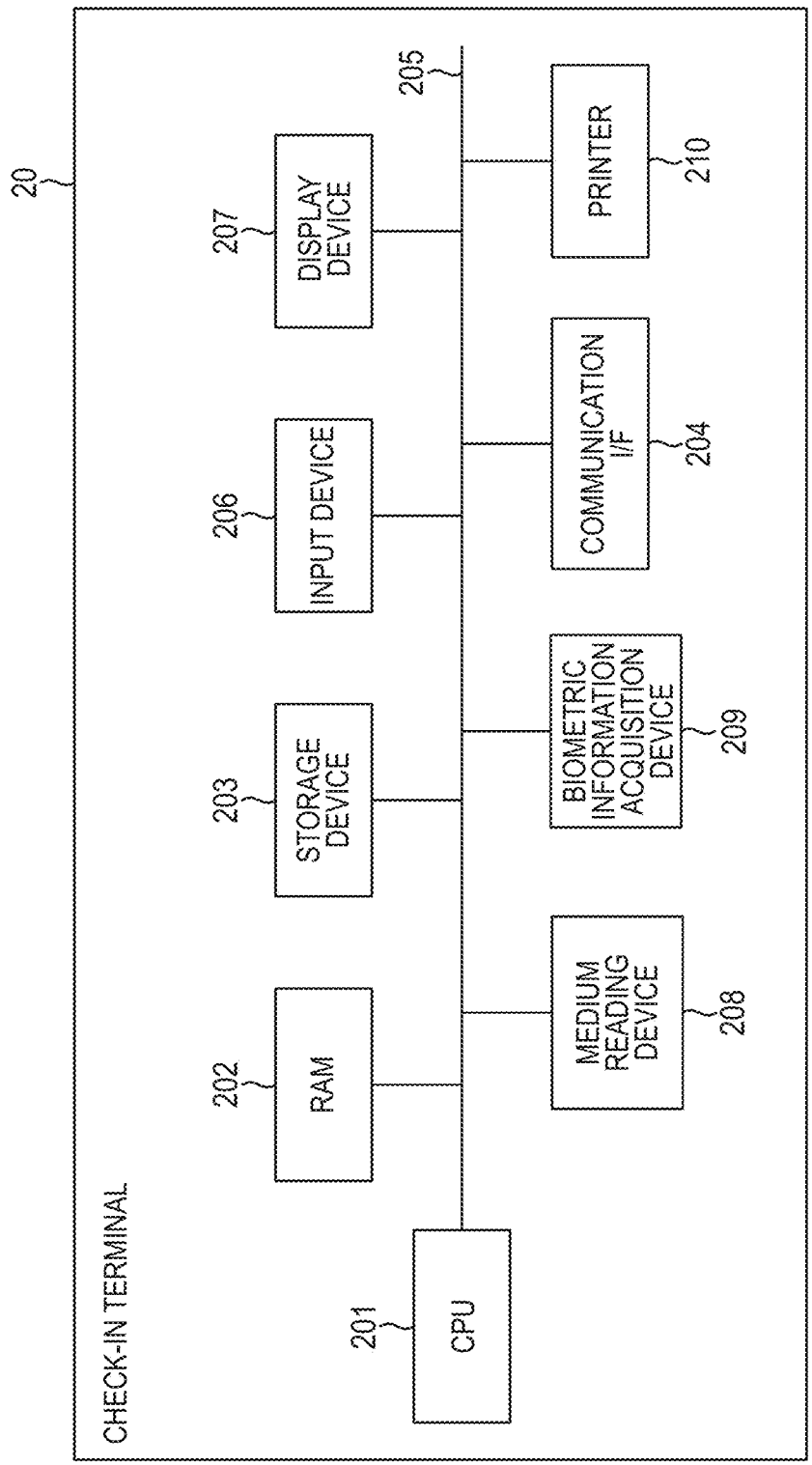
FIG. 7 is a block diagram illustrating an example of a hardware configuration of a check-in terminal in the first example embodiment.
Figure 9:
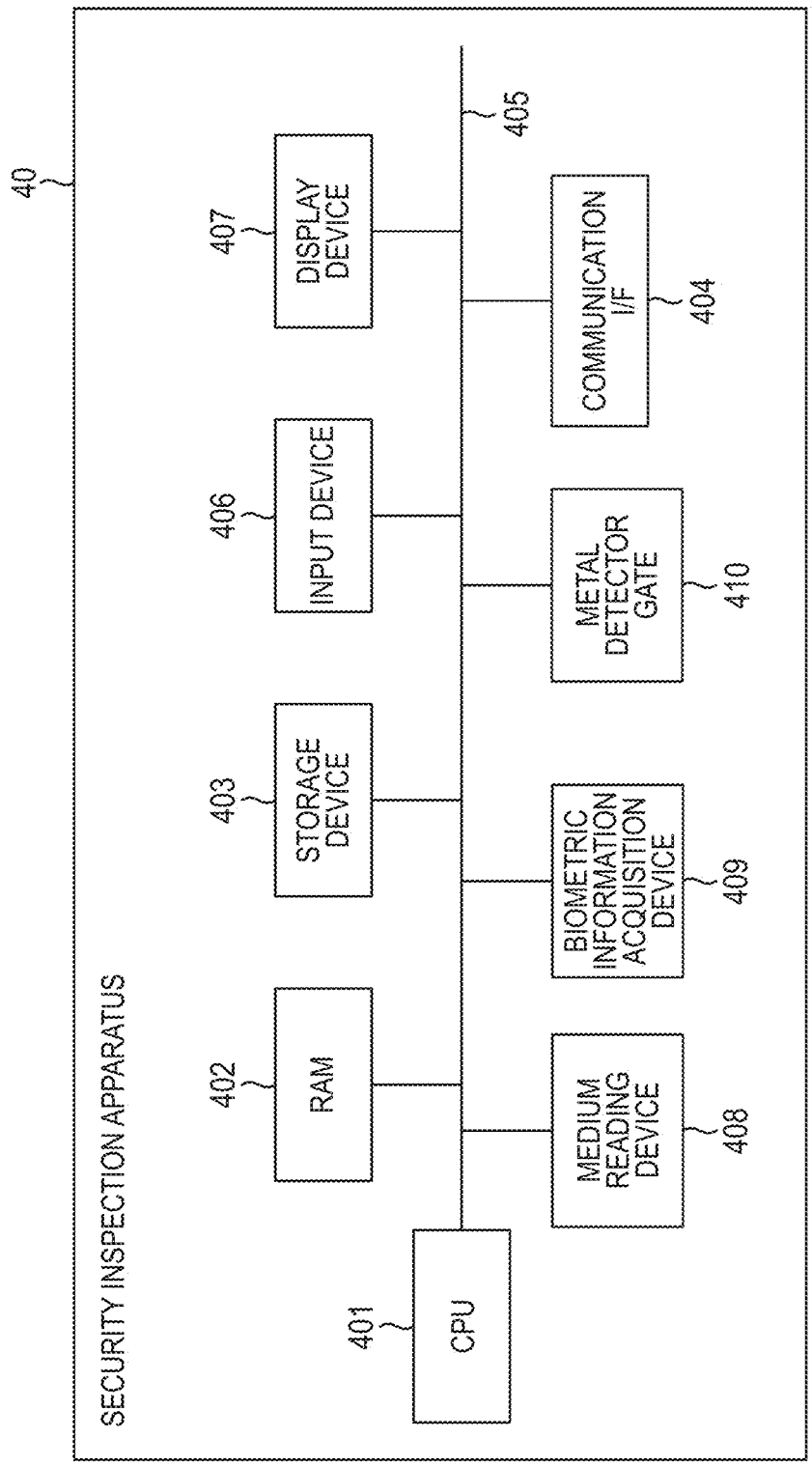
FIG. 9 is a block diagram illustrating an example of a hardware configuration of a security inspection apparatus in the first example embodiment.

FIG. 7 is a block diagram illustrating an example of the hardware configuration of the check-in terminal 20. As illustrated in FIG. 9, the check-in terminal 20 has a CPU 201, a RAM 202, a storage device 203, a communication I/F 204, an input device 206, a display device 207, a medium reading device 208, a biometric information acquisition device 209, and a printer 210. Each device is connected to a bus line 205.

The input device 206 is a pointing device such as a touch panel, a keyboard, or the like, for example. In the check-in terminal 20 of the present example embodiment, the display device 207 and the input device 206 are integrally formed as a touch panel. The display device 207 is a liquid crystal display device, an organic light emitting diode (OLED) display device, or the like and is used for displaying a moving image, a still image, a text, or the like.

The medium reading device 208 is a device that reads a medium such as a passport, an airline ticket, or the like of the user U and acquires information recorded in the medium. The airline ticket medium may be, for example, a paper airline ticket, a mobile terminal displaying an e-ticket receipt, or the like.

The medium reading device 208 is formed of a code reader, an image scanner, a contactless integrated circuit (IC) reader, an optical character reader (OCR) device, or the like, for example, and acquires information from various media presented to the reading unit thereof.

The biometric information acquisition device 209 is a device that acquires a face image of the user U as biometric information on the user U. The biometric information acquisition device 209 is, for example, a digital camera used for capturing a face of the user U standing in front of the check-in terminal 20 and captures the face of the user U to acquire the face image. Note that, when an existing check-in terminal 20 does not have a biometric authentication function, the biometric information acquisition device 209 may be added to the check-in terminal 20 as a peripheral via a USB terminal or the like. The printer 210 prints a boarding ticket or the like on a predetermined sheet under the control of the CPU 201.

Figure 10:
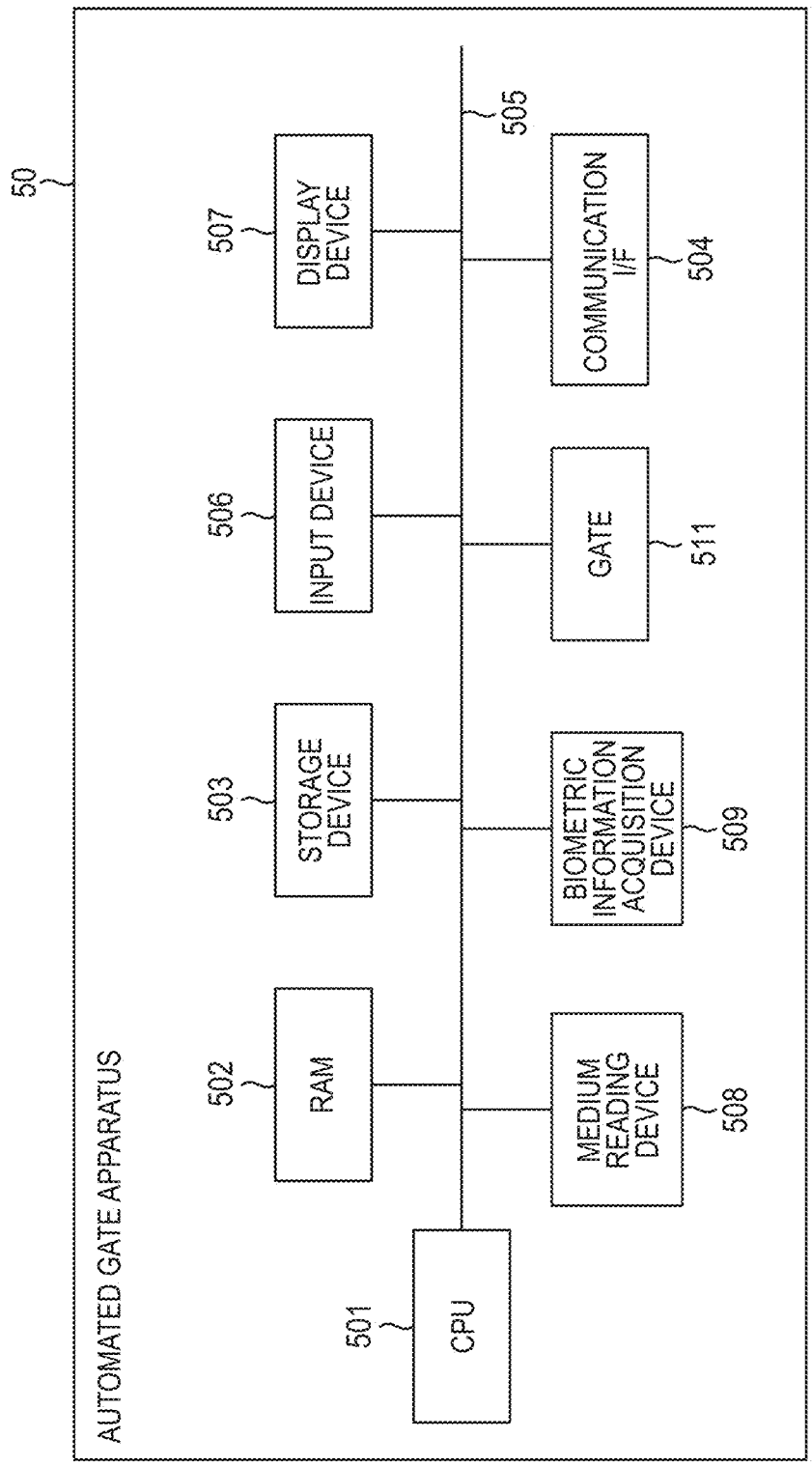
FIG. 10 is a block diagram illustrating an example of a hardware configuration of an automated gate apparatus in the first example embodiment.

FIG. 8 is a block diagram illustrating an example of the hardware configuration of the automatic baggage check-in machine 30. As illustrated in FIG. 10, the automatic baggage check-in machine 30 has a CPU 301, a RAM 302, a storage device 303, a communication I/F 304, an input device 306, a display device 307, a medium reading device 308, a biometric information acquisition device 309, a baggage transport device 310, and an output device 311. Each device is connected to a bus line 305.

The baggage transport device 310 transports baggage of the user U for loading the baggage to the aircraft that the user U boards. The baggage transport device 310 transports, to a baggage handling place, baggage which is placed on receiving part by the user U and to which a baggage tag is attached.

The output device 311 is a device that outputs a baggage tag to be attached to checking-in baggage. Further, the output device 311 outputs a baggage claim tag that is necessary when the user U claims his/her baggage after arriving at the destination. Note that a baggage tag or a baggage claim tag is associated with at least one of a passport number, a reservation number, and a token ID.

Figure 11:
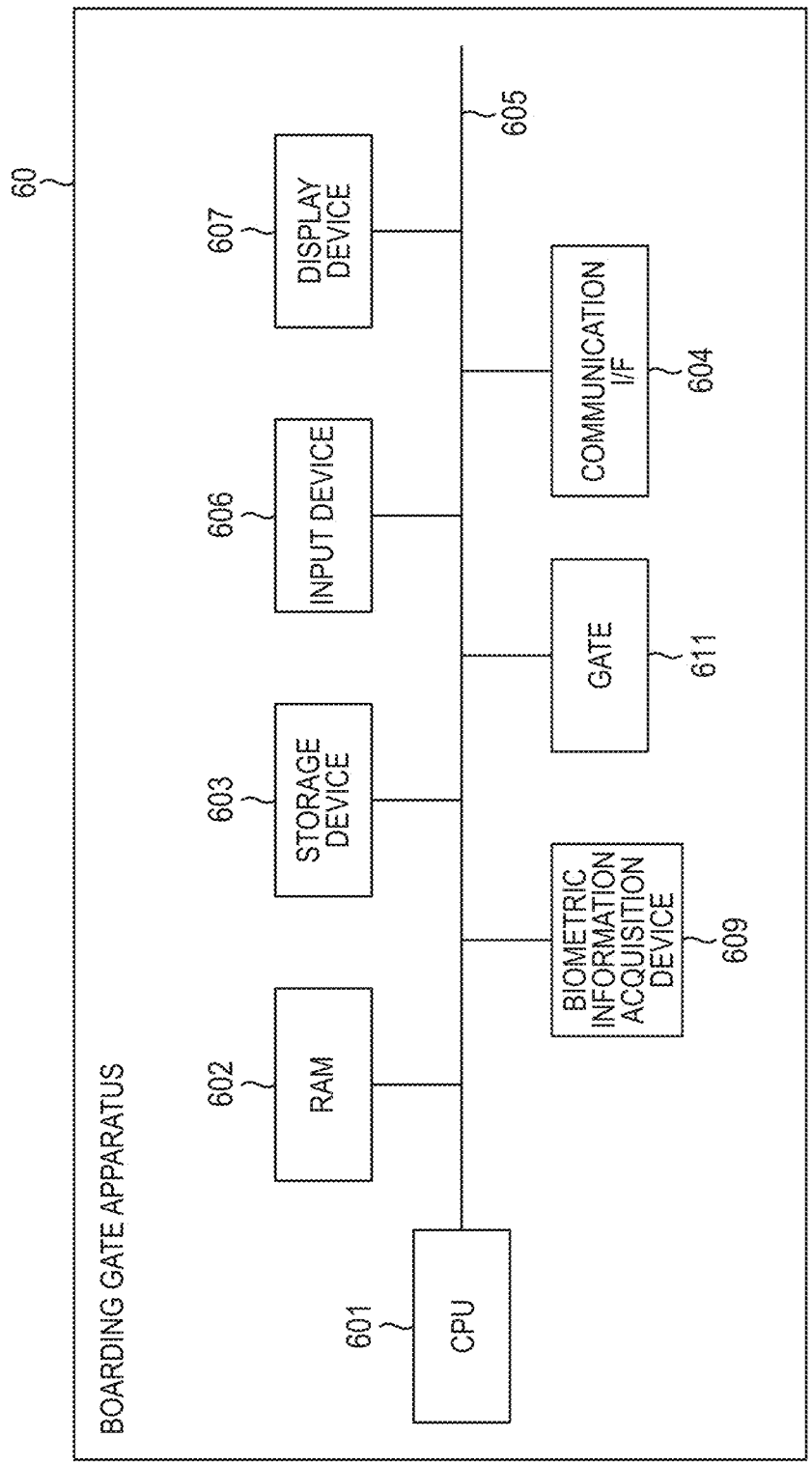
FIG. 11 is a block diagram illustrating an example of a hardware configuration of a boarding gate apparatus in the first example embodiment.

FIG. 9 is a block diagram illustrating an example of the hardware configuration of the security inspection apparatus 40. As illustrated in FIG. 11, the security inspection apparatus 40 has a CPU 401, a RAM 402, a storage device 403, a communication I/F 404, an input device 406, a display device 407, a medium reading device 408, a biometric information acquisition device 409, and a metal detector gate 410. Each device is connected to a bus line 405.

The metal detector gate 410 is a gate type metal detector and detects a metal object worn by the user U passing through the metal detector gate 410.

FIG. 10 is a block diagram illustrating an example of the hardware configuration of the automated gate apparatus 50. The automated gate apparatus 50 has a CPU 501, a RAM 502, a storage device 503, a communication I/F 504, an input device 506, a display device 507, a medium reading device 508, a biometric information acquisition device 509, and a gate 511. Each device is connected to a bus line 505.

The gate 511 transitions from a closed state to block passage of the user U during standby to an open state to permit passage of the user U under the control of the CPU 501 when identity verification of the user U at the automated gate apparatus 50 is successful and the user U has passed through the departure inspection. The scheme of the gate 511 is not particularly limited, and the gate 511 may be, for example, a flapper gate in which one or more flappers provided to one side or both sides of a passage are opened and closed, a turn style gate in which three bars are revolved, or the like.

Figure 13:
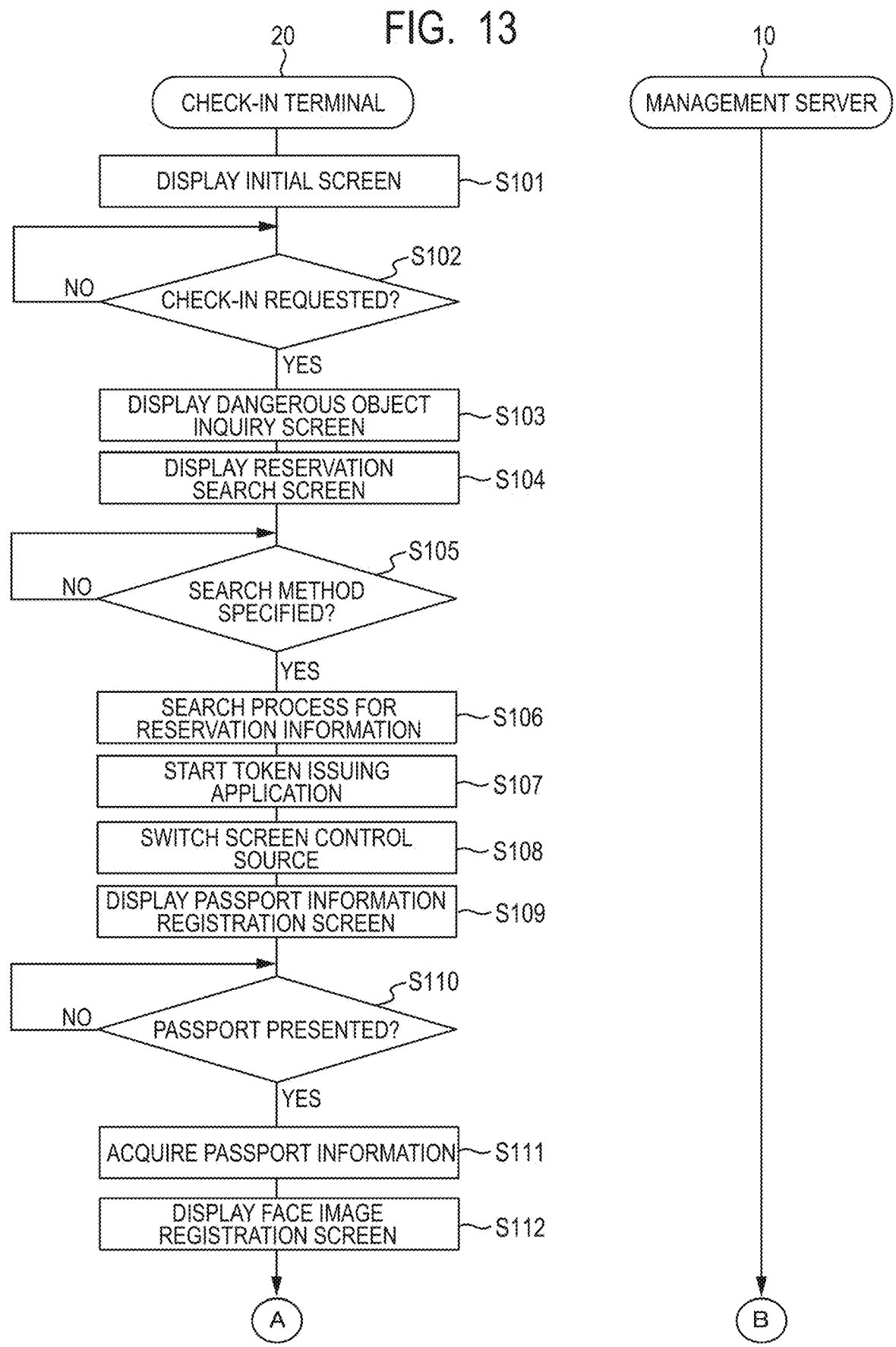
FIG. 13 is a sequence diagram illustrating an example of a process of the check-in terminal and the management server in the first example embodiment.

FIG. 11 is a block diagram illustrating an example of the hardware configuration of the boarding gate apparatus 60. As illustrated in FIG. 13, the boarding gate apparatus 60 has a CPU 601, a RAM 602, a storage device 603, a communication I/F 604, an input device 606, a display device 607, a biometric information acquisition device 609, and a gate 611. Each device is connected to a bus line 605.

Figure 12:
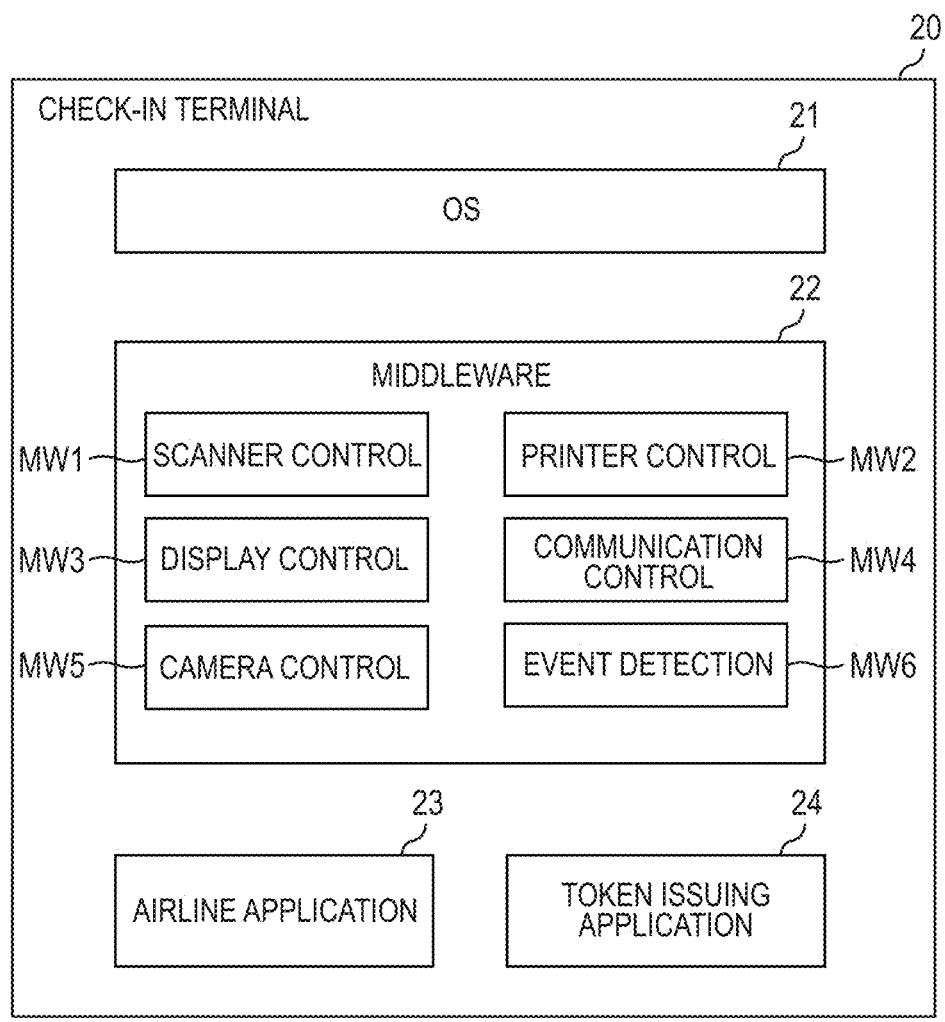
FIG. 12 is a block diagram illustrating an example of a software configuration of the check-in terminal in the first example embodiment.

FIG. 12 is a block diagram illustrating an example of the software configuration of the check-in terminal 20. The check-in terminal 20 has operating system (OS) 21, middleware 22, an airline application 23, and a token issuing application 24.

The OS 21 provides standard interface to the user and applications (the airline application 23 and the token issuing application 24) and manages each resource such as hardware. Specifically, the OS 21 performs management of the storage device 203, memory management such as virtual storage, process management such as multitask, control of graphical user interface (GUI), communication control, and the like.

The middleware 22 is software that plays an intermediate role between the OS 21 that performs basic control of a computer and an application that performs each operation process. In other words, the middleware 22 is software that expands the function of the OS 21 or gathers functions common to applications (the airline application 23 and the token issuing application 24).

In FIG. 12, scanner control MW1, printer control MW2, display control MW3, communication control MW4, camera control MW5, and event detection MW6 are illustrated as examples for the middleware 22. When an application outputs a request to the middleware 22, the middleware 22 outputs a necessary request to the OS 21. The OS 21 then returns a process result to the application. Furthermore, the middleware 22 controls startup, stop, monitoring, and the like of each application.

The airline application 23 is an application for communicating with a host computer (not illustrated) of the reservation system 2 of an airline company and performing an aircraft check-in procedure (boarding procedure) based on information on operation input performed by the user U.

The airline application 23 of the present example embodiment sequentially displays a dangerous object inquiry screen, a reservation information search method searching screen, a reservation information confirmation screen, and the like on the display device 207 in cooperation with the middleware 22 in response to a request for a check-in procedure from the user U, then performs a check-in procedure based on information on the operation input performed by the user U, and controls the printer 210 to print a boarding ticket. Note that the airline application 23 is provided on an airline company basis. For example, when a single check-in terminal 20 is used for check-in procedures to a plurality of airline companies, a plurality of airline applications 23 may be installed. Further, the display order of screens and displayed screens differ for respective airline applications 23.

On the other hand, the token issuing application 24 is an application installed for newly implementing a face authentication function to the check-in terminal 20. The token issuing application 24 of the present example embodiment has, in cooperation with the middleware 22, a function of acquiring biometric information on the user U (a captured face image) by using the biometric information acquisition device 209 and a function of reading passport information from a passport by using the medium reading device 208.

Furthermore, the token issuing application 24 has a function of matching biometric information on the user U with a passport face image included in passport information and a function of issuing a token ID on a user U basis if a result of the matching is that the matching is successful and storing face images of the user U (a captured face image, a passport face image) and boarding reservation information in association with each other. Specifically, the token issuing application 24 sequentially displays a passport information registration screen, a biometric information registration screen, and the like on the display device 207, performs a reading process or a matching process described above based on information on operation input from the user U, and outputs a result of the process to the airline application 23 or the management server 10.

Note that the middleware 22, the airline application 23, and the token issuing application 24 of the present example embodiment are all created in compliance with the rules defined by International Air Transport Association (IATA).

Subsequently, the operation of respective devices in the information processing system 1 in the present example embodiment will be described with reference to FIG. 13 to FIG. 18.

[Check-In Procedure]

Figure 14:
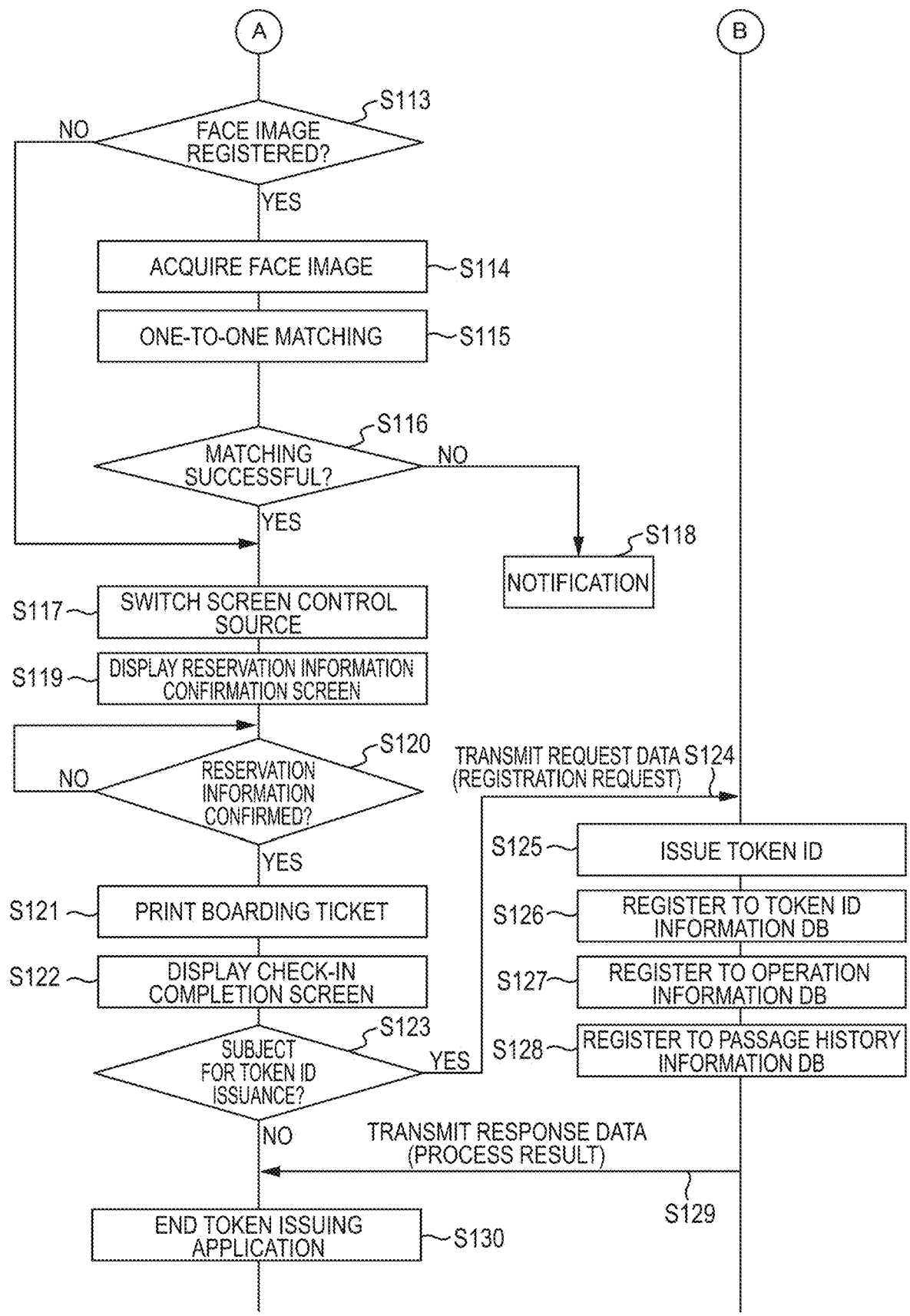
FIG. 14 is a sequence diagram illustrating an example of a process of the check-in terminal and the management server in the first example embodiment.

FIG. 13 and FIG. 14 are sequence diagrams illustrating an example of the process of the check-in terminal 20 and the management server 10. This process is performed when the user U uses the check-in terminal 20 to perform a check-in procedure.

First, the check-in terminal 20 displays an initial screen on the display device 207 by using the airline application 23 (step S101). Next, the check-in terminal 20 determines whether or not check-in has been requested by the user U (step S102) and stands by until a check-in request is made (step S102, NO).

Next, if the check-in terminal 20 determines that check-in has been requested by the user U (step S102, YES), the process proceeds to step S103.

In step S103, the check-in terminal 20 displays the dangerous object inquiry screen on the display device 207. After confirmation by the user U is completed, the check-in terminal 20 displays the reservation search screen on the display device 207 (step S104). A search method for reservation information may be a method using an e-ticket number, a reservation number, a passport number, or a two-dimensional barcode, for example.

Next, the check-in terminal 20 determines whether or not a search method is specified by the user U on the reservation search screen (step S105) and stands by until a search method is specified (step S105, NO).

Next, if the check-in terminal 20 determines that a search method is specified (step S105, YES), the check-in terminal 20 performs a process of searching for reservation information based on the specified method (step S106). In this step, the check-in terminal 20 holds a search result in the storage device 203 or the RAM 202.

Next, the check-in terminal 20 starts the token issuing application 24 (step S107) and switches the application that controls the screen from the airline application 23 to the token issuing application 24 (step S108).

Next, the check-in terminal 20 displays the passport information registration screen on the display device 207 by using the token issuing application 24 (step S109), then determines whether or not the passport of the user U is presented to the reading unit of the medium reading device 208 (step S110), and stands by until a passport is presented (step S110, NO).

Next, if the check-in terminal 20 determines that a passport is presented to the reading unit of the medium reading device 208 (step S110, YES), the check-in terminal 20 acquires passport information on the user U from the presented passport by using the token issuing application 24 (step S111). The acquired passport information includes a passport face image of the user U, identity verification information, a passport number, a passport issuance nation, or the like. In this step, the check-in terminal 20 (token issuing application 24) holds the passport information in the storage device 203 or the RAM 202.

Next, the check-in terminal 20 displays the face image registration screen on the display device 207 by using the token issuing application 24 (step S112) and determines whether or not a consent about registration of a face image is obtained from the user U (step S113). For example, it is preferable to display a guidance message such as "By registering your face image, you can easily perform the following procedures required before departure through face recognition. The registered face image will be deleted from the system after boarding is completed." on a face image registration screen and obtain the consent from the user U.

If the check-in terminal 20 determines that a consent about registration of a face image is obtained from the user U (step S113, YES), the process proceeds to step S114. In contrast, if the check-in terminal 20 determines that a consent about registration of a face image is not obtained from the user U (step S113, NO), the process proceeds to step S117.

In step S114, the check-in terminal 20 captures the user U to acquire a face image from the captured image. The check-in terminal 20 then matches the face image with the passport face image in a one-to-one manner (step S115).

Next, the check-in terminal 20 determines whether or not a result of the matching of the captured face image with the passport face image is that the matching is successful (step S116). Herein, if the check-in terminal 20 determines that the result of the matching is that the matching is successful (step S116, YES), the process proceeds to step S117. In contrast, if the check-in terminal 20 determines that the result of the matching is that the matching failed (step S116, NO), the check-in terminal 20 notifies the user of an error message (step S118). For example, a notification screen including a message such as "Please perform a check-in procedure at the manned counter" is displayed on the display device 207.

In step S117, the check-in terminal 20 switches the application that controls the screen from the token issuing application 24 to the airline application 23. The check-in terminal 20 then displays the reservation information confirmation screen by using the airline application 23 (step S119). The reservation information held in the storage device 203 or the like in step S106 is displayed in the reservation information confirmation screen. The user may confirm reservation information in the reservation information confirmation screen and apply for a seat change or the like.

Next, the check-in terminal 20 determines whether or not confirmation of reservation information performed by the user U is completed (step S120). Herein, if the check-in terminal 20 determines that confirmation of the reservation information is completed (step S120, YES), the process proceeds to step S121. In contrast, if the check-in terminal 20 determines that confirmation of the reservation information is not completed (step S120, NO), the check-in terminal 20 stands by until confirmation is completed.

In step S121, the check-in terminal 20 prints a boarding ticket by using the printer 210 and displays a check-in completion screen on the display device 207 by using the airline application 23 (step S122).

Next, in response to the completion of the check-in procedure, the check-in terminal 20 determines whether or not the user U is a subject for issuance of a token ID (step S123). Specifically, if it has been determined in the process of steps S113 to S116 that the result of matching of the passport face image with the captured face image is that the matching is successful and the user U is a person whose face image can be registered in a database, the user U is determined to be a subject for issuance of a token ID. Herein, if the check-in terminal 20 determines that the user U is a subject for issuance of a token ID (step S123, YES), the check-in terminal 20 transmits request data including an issuance request for a token ID and a registration request for the passage history information, the passport information, the captured face image, and the boarding reservation information (boarding information) to the management server 10 (step S124). In contrast, if the check-in terminal 20 determines that the user U is not a subject for issuance of a token ID (step S123, NO), the process proceeds to step S130.

Next, in response to receiving the request data from the check-in terminal 20, the management server 10 issues a token ID (step S125). The token ID is set to a unique value based on date and time of processing or a sequence number, for example.

Next, the management server 10 uses the captured face image as a registered face image and registers the relationship between the token ID and the registered face image information to the token ID information DB 11 (step S126).

In the present example embodiment, the reason why a captured face image captured on site is used as a registered face image is that the validated period (lifecycle) of a token ID expires within the day, that a captured face image is of closer quality (appearance) to an image captured in a subsequent authentication process than a passport face image, or the like. However, instead of a captured face image, a passport face image may be set to a registered face image (registered biometric information). For example, when the lifecycle of a token ID is long (for example, when a token ID is validated for a certain validated period for a membership in the airline business or the like), a face image of a passport or a license can be set as a registered face image.

Next, the management server 10 uses passport information and boarding reservation information as operation information to register the relationship between the token ID and the operation information to the operation information DB 13 (step S127). In such a way, while control data required for face authentication and operation information required for performing operation are managed in separate databases, a registered face image and the operation information are associated with each other by a token ID. Further, the passport face image of the user U may be further registered in the operation information DB 13 or the token ID information DB 11.

Next, the management server 10 registers passage history information indicating the relationship between the token ID and passage information at the touch point P1 to the passage history information DB 12 (step S128).

The management server 10 then transmits response data including respective process results of the token ID issuance process, the operation information registration process, and the passage history information registration process to the check-in terminal 20 (step S129). The check-in terminal 20 ends the token issuing application 24 based on reception of the determination result of step S123 or the response data from the management server 10 (step S130) and ends the process of FIG. 13 and FIG. 14.

In such a way, a target face image (captured face image) successfully matched with a passport face image acquired from a passport in a check-in procedure is registered to the token ID information DB 11 as a registered face image, and a registered face image and operation information of the operation information DB 13 are associated with each other by the issued token ID. This enables a matching process between the captured face image and the registered face image to be made at each subsequent touch point. That is, the token ID associated with the registered face image is identification information that can be commonly used at all the touch points. The use of such a commonized token ID can increase efficiency of inspection on the user U.

[Baggage Check-In Procedure]

Figure 15:
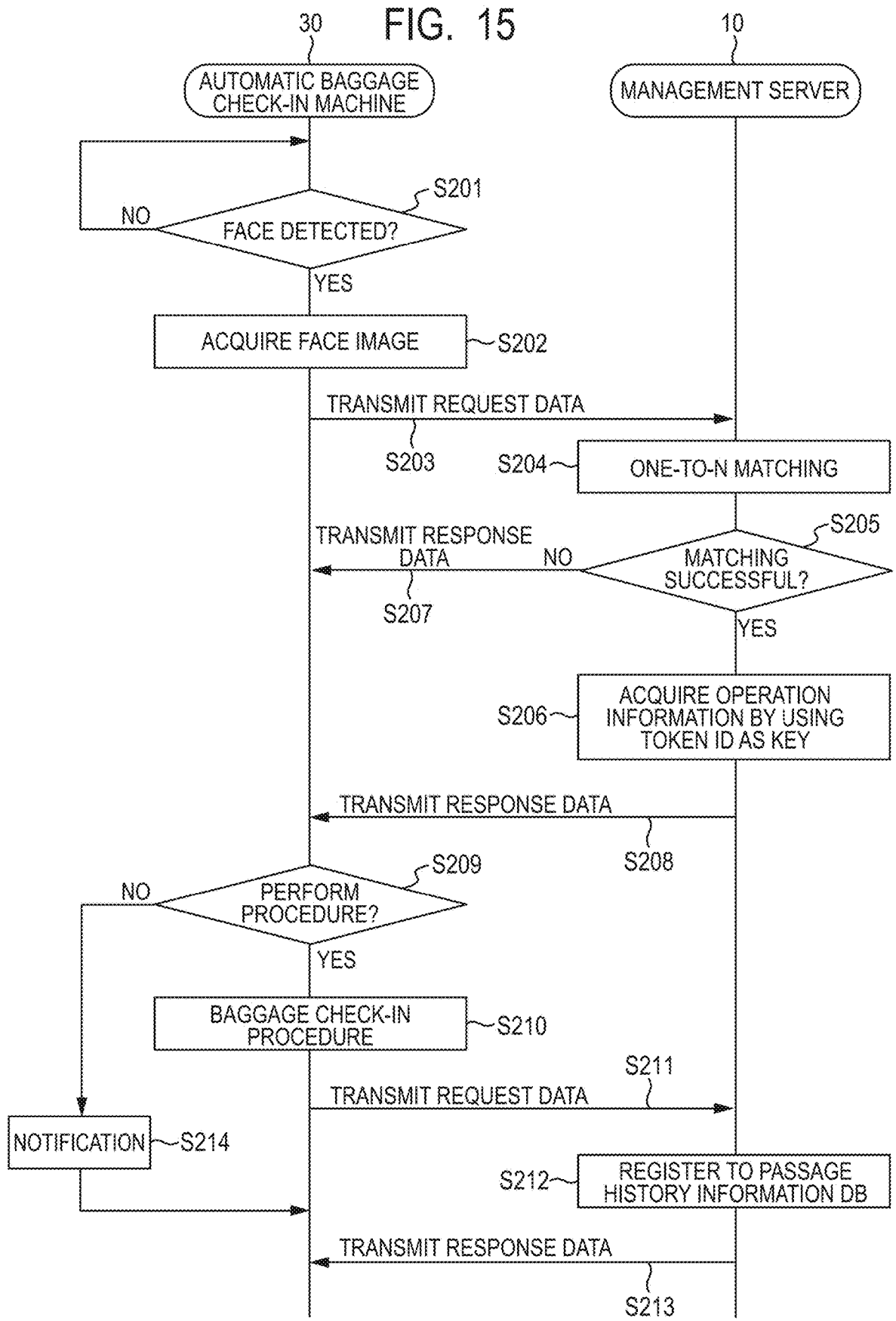
FIG. 15 is a sequence diagram illustrating an example of a process of the automatic baggage check-in machine and the management server in the first example embodiment.

FIG. 15 is a sequence diagram illustrating an example of the process of the automatic baggage check-in machine 30 and the management server 10. This process is performed when the user U who completed a check-in procedure is subjected to a baggage check-in procedure as needed.

The automatic baggage check-in machine 30 captures an image of an area in front of the machine continually or periodically and determines whether or not a face of the user U standing in front of the automatic baggage check-in machine 30 is detected in the captured image (step S201). The automatic baggage check-in machine 30 stands by until a face of the user U is detected in an image by the biometric information acquisition device 309 (step S201, NO).

If the automatic baggage check-in machine 30 determines that a face of the user U is detected by the biometric information acquisition device 309 (step S201, YES), the automatic baggage check-in machine 30 captures the face of the user U and acquires a face image of the user U as a target face image (step S202).

Next, the automatic baggage check-in machine 30 transmits the request data that requests execution of a matching process between the target face image and the registered face image to the management server 10 (step S203).

In response to receiving the request data from the automatic baggage check-in machine 30, the management server 10 performs matching of a face image of the user U (step S204). That is, the management server 10 matches the target face image included in the request data received from the automatic baggage check-in machine 30 with a plurality of registered face images registered in the token ID information DB 11 on a one-to-N basis. Note that the registered face images to be matched are limited to images associated with a token ID whose invalidation flag value is "1" (valid).

Herein, if the management server 10 determines that the result of matching is that the matching failed (step S205, NO), the management server 10 transmits the response data including matching result information indicating the failed matching to the automatic baggage check-in machine 30 (step S207), and the process proceeds to step S209. In contrast, if the management server 10 determines that the result of matching is that the matching is successful (step S205, YES), the process proceeds to step S206.

In step S206, the management server 10 acquires operation information from the operation information DB 13 by using, as a key, the token ID associated with the successfully matched registered face image in the token ID information DB 11. The management server 10 then transmits the response data to the automatic baggage check-in machine 30 (step S208).

Next, if the automatic baggage check-in machine 30 references the response data and determines that it is possible to perform the procedure (step S209, YES), the automatic baggage check-in machine 30 performs a process of a baggage check-in procedure for the user U (step S210).

Next, the automatic baggage check-in machine 30 transmits request data that requests registration of passage history information on the user U to the management server 10 (step S211).

In response to receiving the request data from the automatic baggage check-in machine 30, the management server 10 registers passage history information indicating the relationship between the token ID and passage information on the user U at the touch point P2 to the passage history information DB 12 (step S212).

The management server 10 then transmits the response data to the automatic baggage check-in machine 30 (step S213) and ends the process.

On the other hand, if the automatic baggage check-in machine 30 references the response data and determines that it is not possible to perform the procedure (step S209, NO), the automatic baggage check-in machine 30 notifies the user U of an error message (step S214). For example, a notification screen including a message such as "Please check in your baggage at the manned counter." is displayed on the display device 307.

[Security Inspection Procedure]

Figure 16:
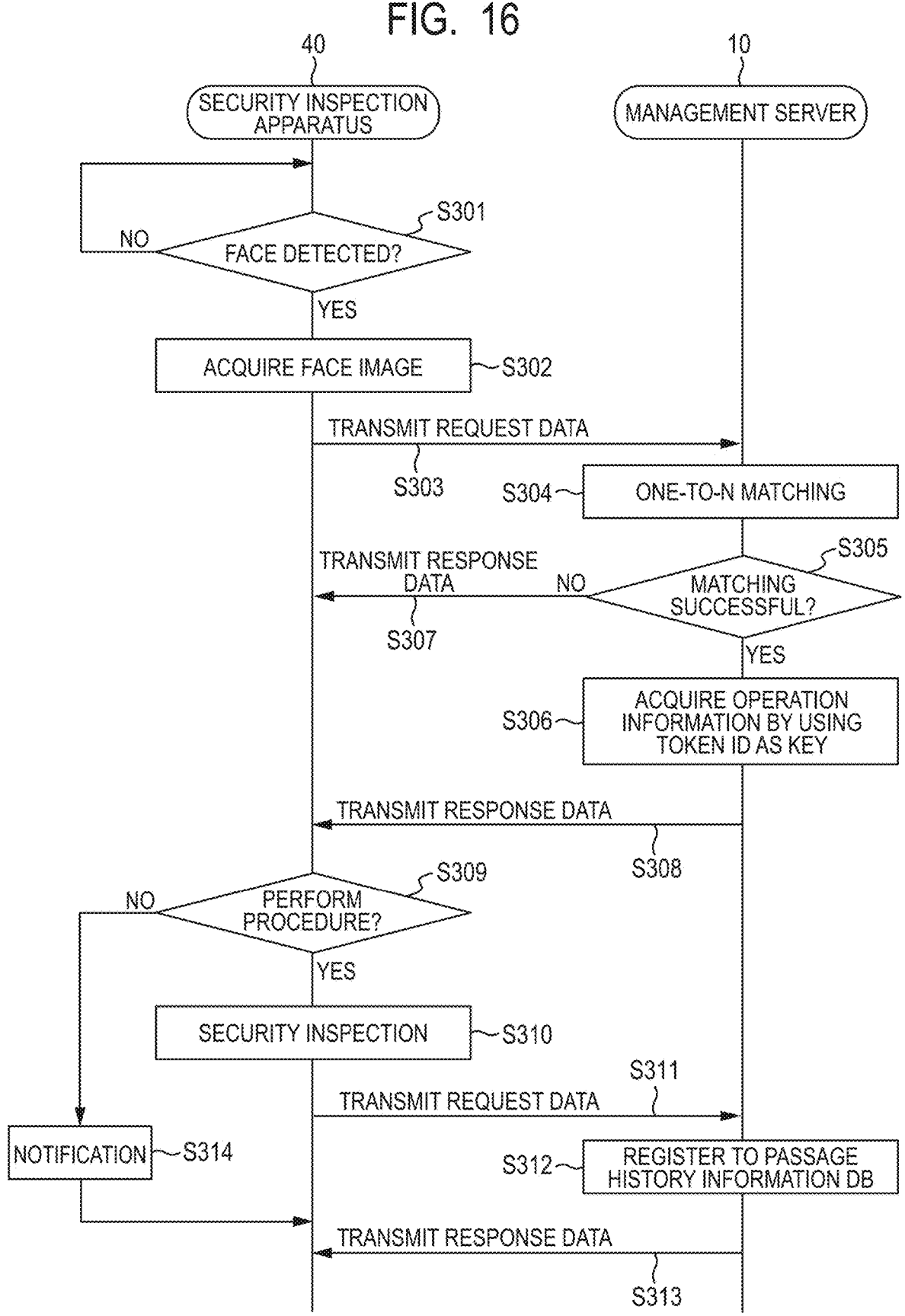
FIG. 16 is a sequence diagram illustrating an example of a process f the security inspection apparatus and the management server in the first example embodiment.

FIG. 16 is a sequence diagram illustrating an example of the process of the security inspection apparatus 40 and the management server 10. This process is performed when the user U who completed a check-in procedure is subjected to a security inspection procedure.

The security inspection apparatus 40 captures an image of an area in front of the entrance of the security inspection site continually or periodically and determines whether or not a face of the user U standing in front of the entrance is detected in the captured image (step S301). The security inspection apparatus 40 stands by until a face of the user U is detected in an image by the biometric information acquisition device 409 (step S301, NO).

If the security inspection apparatus 40 determines that a face of the user U is detected by the biometric information acquisition device 409 (step S301, YES), the security inspection apparatus 40 captures the face of the user U and acquires a face image of the user U as a target face image (step S302).

Next, the security inspection apparatus 40 transmits the request data that requests execution of a matching process between the target face image and the registered face image to the management server 10 (step S303).

In response to receiving the request data from the security inspection apparatus 40, the management server 10 performs matching of a face image of the user U (step S304). That is, the management server 10 matches the target face image included in the request data received from the security inspection apparatus 40 with a plurality of registered face images registered in the token ID information DB 11 on a one-to-N basis. Note that the registered face images to be matched are limited to images associated with a token ID whose invalidation flag value is "1" (valid).

Herein, if the management server 10 determines that the result of matching is that the matching failed (step S305, NO), the management server 10 transmits the response data including the result of matching of the failed matching to the security inspection apparatus 40 (step S307), and the process proceeds to step S309. In contrast, if the management server 10 determines that the result of matching is that the matching is successful (step S305, YES), the process proceeds to step S306.

In step S306, the management server 10 acquires operation information from the operation information DB 13 by using, as a key, the token ID associated with the successfully matched registered face image in the token ID information DB 11. The management server 10 then transmits the response data including the matching result information, the token ID, and the operation information to the security inspection apparatus 40 (step S308).

Next, if the security inspection apparatus 40 references the response data and determines that it is possible to perform the procedure (step S309, YES), the security inspection apparatus 40 performs a security inspection process on the user U (step S310). In the security inspection process, the CPU 401 controls each component of the security inspection apparatus 40. Accordingly, the security inspection apparatus 40 detects a metal object worn by the user U passing through the metal detector gate 410. The user U who has passed through the metal detector gate 410 moves to the departure inspection site.

Next, the security inspection apparatus 40 transmits the request data that requests registration of passage history information on the user U to the management server 10 (step S311).

In response to receiving the request data from the security inspection apparatus 40, the management server 10 registers passage history information indicating the relationship between the token ID and passage information on the user U at the touch point P3 to the passage history information DB 12 (step S312).

The management server 10 then transmits the response data to the security inspection apparatus 40 (step S313) and ends the process.

On the other hand, if the security inspection apparatus 40 references the response data and determines that it is not possible to perform the procedure (step S309, NO), the security inspection apparatus 40 notifies the user U of an error message (step S314). For example, a notification screen including a message such as "A staff member will come. Please wait a moment" is displayed on the display device 407.

[Departure Inspection Procedure]

Figure 17:
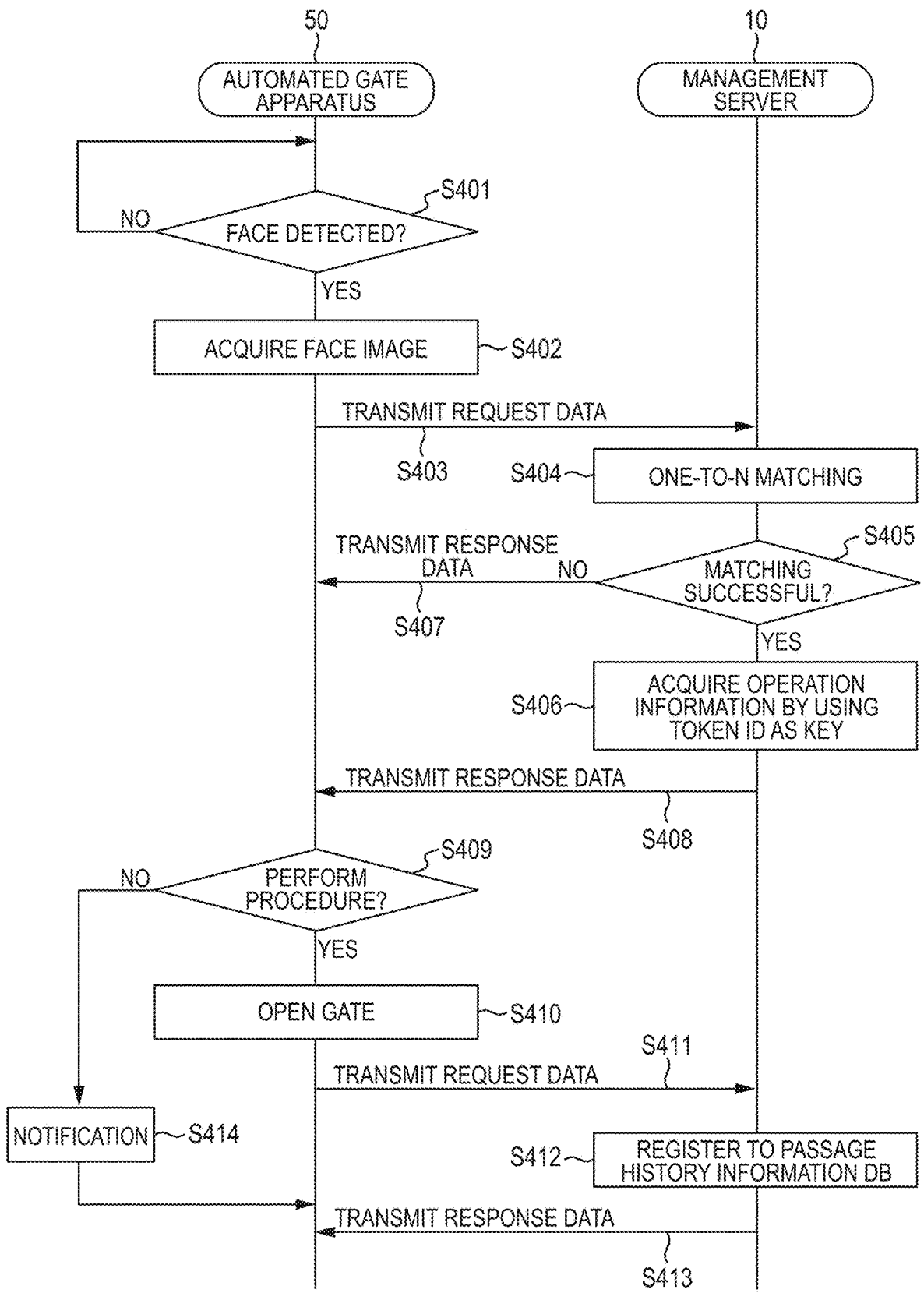
FIG. 17 is a sequence diagram illustrating an example of a process of the automated gate apparatus and the management server in the first example embodiment.

FIG. 17 is a sequence diagram illustrating an example of the process of the automated gate apparatus 50 and the management server 10. This process is performed when the user U who completed a security inspection procedure is subjected to a departure inspection procedure.

The automated gate apparatus 50 captures an image of an area in front of the automated gate apparatus 50 continually or periodically and determines whether or not a face of the user U standing in front of the automated gate apparatus 50 is detected in the captured image (step S401). The automated gate apparatus 50 stands by until a face of the user U is detected in an image by the biometric information acquisition device 509 (step S401, NO).

If the automated gate apparatus 50 determines that a face of the user U is detected by the biometric information acquisition device 509 (step S401, YES), the automated gate apparatus 50 captures the face of the user U and acquires a face image of the user U as a target face image (step S402).

Next, the automated gate apparatus 50 transmits the request data that requests execution of a matching between the target face image and the process registered face image to the management server 10 (step S403).

In response to receiving the request data from the automated gate apparatus 50, the management server 10 performs matching of a face image of the user U (step S404). That is, the management server 10 matches the target face image included in the request data received from the automated gate apparatus 50 with a plurality of registered face images registered in the token ID information DB 11 on a one-to-N basis. Note that the registered face images to be matched are limited to images associated with a token ID whose invalidation flag value is "1" (valid).

Herein, if the management server 10 determines that the result of matching is that the matching failed (step S405, NO), the management server 10 transmits the response data including matching result information indicating the failed matching to the automated gate apparatus 50 (step S407), and the process proceeds to step S409. In contrast, if the management server 10 determines that the result of matching is that the matching is successful (step S405, YES), the process proceeds to step S406.

In step S406, the management server 10 acquires operation information from the operation information DB 13 by using, as a key, the token ID associated with the successfully matched registered face image in the token ID information DB 11. The management server 10 then transmits the response data including the matching result information, the token ID, and the operation information to the automated gate apparatus 50 (step S408).

Next, if the automated gate apparatus 50 references the response data and determines that it is possible to perform the procedure (step S409, YES), the automated gate apparatus 50 performs a departure inspection procedure on the user U and opens the gate 511 (step S410). The user U who has passed through the touch point P4 moves to the departure area where a boarding gate is present.

Next, the automated gate apparatus 50 transmits the request data that requests registration of passage history information on the user U to the management server 10 (step S411).

In response to receiving the request data from the automated gate apparatus 50, the management server 10 registers passage history information indicating the relationship between the token ID and passage information on the user U at the touch point P4 to the passage history information DB 12 (step S412).

The management server 10 then transmits the response data to the automated gate apparatus 50 (step S413) and ends the process.

On the other hand, if the automated gate apparatus 50 references the response data and determines that it is not possible to perform the procedure (step S409, NO), the automated gate apparatus 50 notifies the user U of an error message (step S414). For example, a notification screen including a message such as "Please perform a departure inspection procedure at the manned counter." is displayed on the display device 507.

[Identity Verification Procedure at Boarding Gate]

Figure 18:
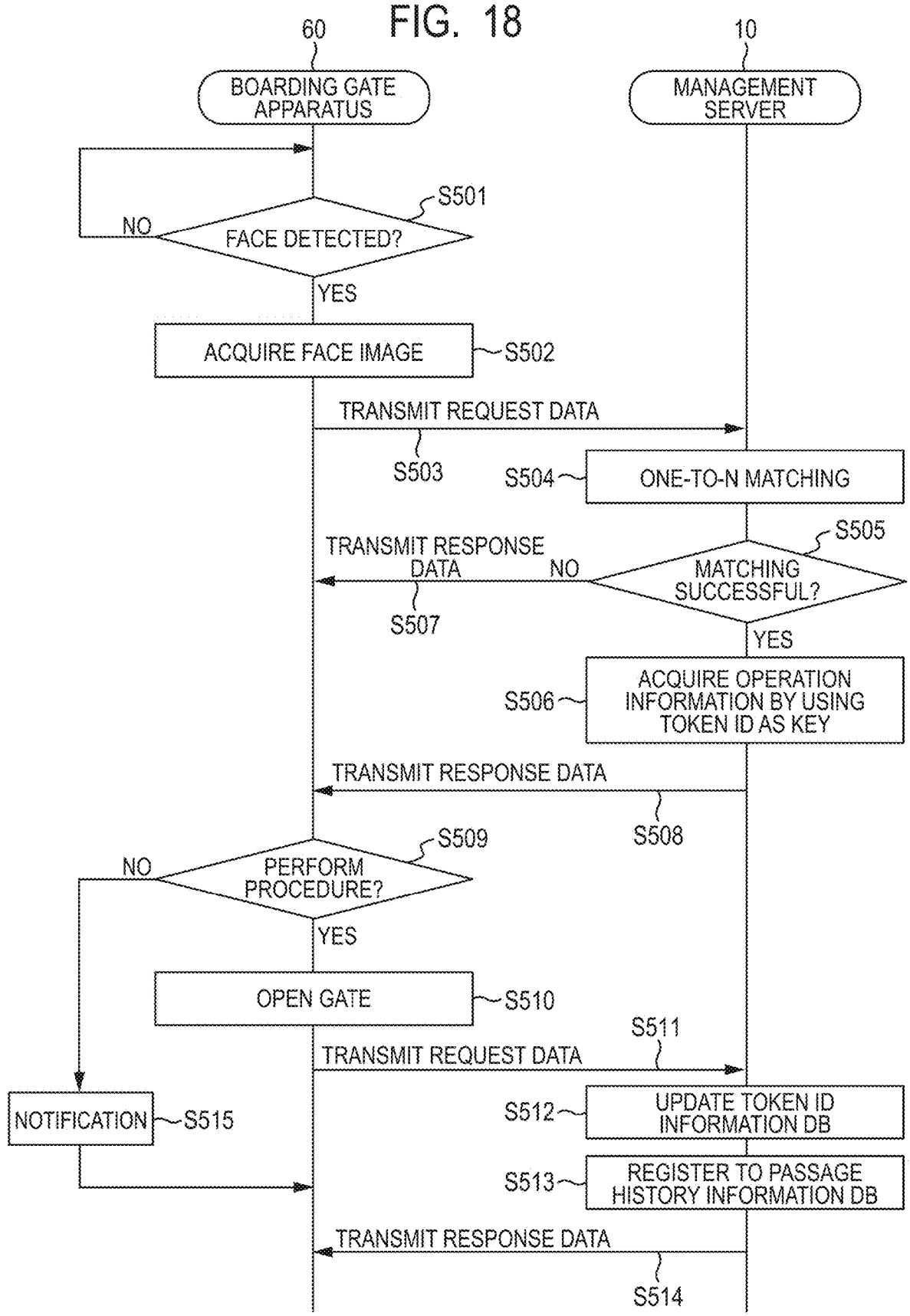
FIG. 18 is a sequence diagram illustrating an example of a process of the boarding gate apparatus and the management server in the first example embodiment.

FIG. 18 is a sequence diagram illustrating an example of the process of the boarding gate apparatus 60 and the management server 10. This process is performed when the user U who completed a departure inspection procedure passes through a boarding gate in order to board an aircraft.

The boarding gate apparatus 60 captures an image of an area in front of the apparatus continually or periodically and determines whether or not a face of the user U standing in front of the boarding gate apparatus 60 is detected in the captured image (step S501). The boarding gate apparatus 60 stands by until a face of the user U is detected in an image by the biometric information acquisition device 609 (step S501, NO).

If the boarding gate apparatus 60 determines that a face of the user U is detected by the biometric information acquisition device 609 (step S501, YES), the boarding gate apparatus 60 captures the face of the user U and acquires a face image of the user U as a target face image (step S502).

Next, the boarding gate apparatus 60 transmits the request data that requests execution of a matching process between the target face image and the registered face image to the management server 10 (step S503).

In response to receiving the request data from the boarding gate apparatus 60, the management server 10 performs matching of a face image of the user U (step S504). That is, the management server 10 matches the target face image included in the request data received from the boarding gate apparatus 60 with a plurality of registered face images registered in the token ID information DB 11 on a one-to-N basis. Note that the registered face images to be matched are limited to images associated with a token ID whose invalidation flag value is "1" (valid).

Herein, if the management server 10 determines that the result of matching is that the matching failed (step S505, NO), the management server 10 transmits the response data including matching result information indicating the failed matching to the boarding gate apparatus 60 (step S507), and the process proceeds to step S509. In contrast, if the management server 10 determines that the result of matching is that the matching is successful (step S505, YES), the process proceeds to step S506.

In step S506, the management server 10 acquires operation information from the operation information DB 13 by using, as a key, the token ID associated with the successfully matched registered face image in the token ID information DB 11. The management server 10 then transmits the response data including the matching result information, the token ID, and the operation information to the boarding gate apparatus 60 (step S508).

Next, if the boarding gate apparatus 60 references the response data and determines that it is possible to perform the procedure (step S509, YES), the boarding gate apparatus 60 performs an aircraft boarding procedure on the user U and opens the gate 611 (step S510). The user U who has passed through the touch point P5 boards the aircraft.

Next, the boarding gate apparatus 60 transmits the request data that requests invalidation of the token ID and registration of passage history information on the user U to the management server 10 (step S511).

In response to receiving the request data from the boarding gate apparatus 60, the management server 10 updates the token ID information DB 11 (step S512). Specifically, the management server 10 updates the invalidation flag of the token ID information DB 11 to a value of invalid ("0"). Accordingly, the validated period (lifecycle) of the token ID expires.

Next, the management server 10 registers passage history information indicating the relationship between the token ID and passage information on the user U at the touch point P5 to the passage history information DB 12 (step S513).

The management server 10 then transmits the response data to the boarding gate apparatus 60 (step S514) and ends the process.

On the other hand, if the boarding gate apparatus 60 references the response data and determines that it is not possible to perform the procedure (step S509, NO), the boarding gate apparatus 60 notifies the user U of an error message (step S515). For example, the boarding gate apparatus 60 displays a notification screen including a message such as "Please perform the procedure at the manned counter." on the display device 607.

As described above, according to the present example embodiment, in a check-in procedure, a series of processes related to biometric authentication (steps S107 to S112 of FIG. 13 and steps S113 to S117 of FIG. 14) and a token ID issuance request (step S124 of FIG. 14) are performed based on control of the token issuing application 24 and the middleware 22. It is thus possible to easily implement a biometric authentication function by simply installing the token issuing application 24 separately to an existing check-in terminal 20 having no biometric authentication function and modifying a part of the middleware 22.

Further, the token issuing application 24 (second processing unit) performs a process of acquiring biometric information, a process of reading passport information, and a matching process before the elapsed time from completion of the process in the airline application 23 (first processing unit) reaches a predetermined time limit. Specifically, since biometric authentication is performed by using a waiting time after the process of inquiry about a dangerous object or the like is performed at the check-in terminal 20, it is possible to implement a biometric authentication function without affecting a process of an existing airline application 23. Further, in a general check-in terminal 20, a sufficient operation time (time limit) has been set from a time of displaying a passport information registration screen that requests the user U to perform a passport reading operation to a time of allowing the user U to complete the passport reading operation. It is thus preferable to start measuring the elapsed time described above from the time of displaying the passport information registration screen.

Second Example Embodiment

Figure 19:
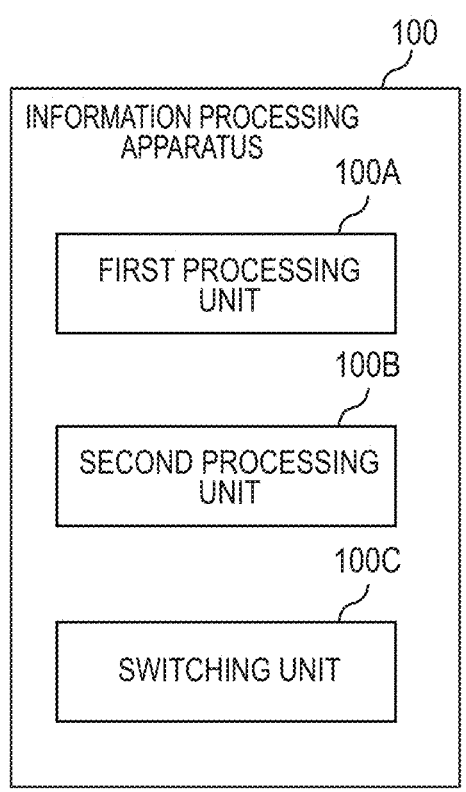
FIG. 19 is a block diagram illustrating a configuration of an information processing apparatus in a second example embodiment.

FIG. 19 is a block diagram illustrating a configuration of the information processing apparatus 100 in a second example embodiment. The information processing apparatus 100 includes a first processing unit 100A, a second processing unit 100B, and a switching unit 100C. The first processing unit 100A performs a predetermined process related to an aircraft boarding procedure and acquires boarding reservation information on a user. When the process is completed, the second processing unit matches biometric information acquired from the user with passport biometric information included in passport information acquired from the user's passport and, when a result of the matching of the biometric information with the passport biometric information is that the matching is successful, associates the passport information, the biometric information, and the boarding reservation information with each other. The switching unit 100C switches whether to operate the first processing unit or the second processing unit. According to the present example embodiment, it is possible to easily implement a face authentication function to an existing check-in terminal 20.

Modified Example Embodiment

Although the present invention has been described above with reference to the example embodiments, the present invention is not limited to the example embodiments described above. Various modifications that can be understood by those skilled in the art can be made to the configuration and details of the present invention within the scope not departing from the spirit of the present invention. For example, it should be understood that an example embodiment in which a configuration of a part of any of the example embodiments is added to another example embodiment or an example embodiment in which a configuration of a part of any of the example embodiments is replaced with a configuration of a part of another example embodiment is also an example embodiment to which the present invention may be applied.

Although the configuration that performs a matching process between a captured face image and a passport face image at the check-in terminal 20 (token issuing application 24) has been described in the above example embodiments, the matching process may be performed on the management server 10 side. That is, the check-in terminal 20 may be configured to transmit request data including a captured face image and a passport face image to the management server 10 and receive a result of the matching from the management server 10. In such a case, since only the management server 10 needs to have a matching function, the function to be added to the check-in terminal 20 can be reduced.

Although the configuration in which the airline application 23 and the token issuing application 24 are installed in terminal the check-in 20 has been described in the above example embodiment, each application may be implemented as a web application. In such a case, the check-in terminal 20 can transmit request data to the host computer of the reservation system 2 and the management server 10 of the present system by using browser applications (not illustrated), respectively, and perform screen display based on response data received from applications on the host computer and the management server 10 side, respectively.

In the above example embodiments, the case where the check-in terminal 20 switches the application that controls a display screen from the airline application 23 to the token issuing application 24 before a passport reading operation takes place has been described. However, the passport registration screen may be displayed by the airline application 23, and when a passport reading operation is detected, the screen may be switched. That is, the passport reading function may be implemented in any of the airline application 23 and the token issuing application 24.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments also includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

Supplementary Note 1

A program that causes a computer to perform:
performing a first process for performing a predetermined process related to an aircraft boarding procedure and acquiring boarding reservation information on a user;
when the process is completed, performing a second process for matching biometric information acquired from the user with passport biometric information included in passport information acquired from a passport of the user and, when a result of the matching of the biometric information with the passport biometric information is the matching is that successful, passport information, the biometric information, and the boarding reservation information with each other; and performing a switching process for switching whether to perform the first process or the second process.

Supplementary Note 2

The program according to supplementary note 1, wherein in the switching process, a screen to be displayed on a display device is switched from a first screen controlled by the first process to a second screen controlled by the second process.

Supplementary Note 3

The program according to supplementary note 2, wherein in the switching process, the second process is started to switch the screen when the process is completed and occurrence of an operation of reading the passport is detected.

Supplementary Note 4

The program according to supplementary note 2, wherein in the switching process, the second process is started to switch the screen after the process is completed and before an operation of reading the passport takes place.

Supplementary Note 5

The program according to any one of supplementary notes 1 to 4, wherein in the second process, a process of acquiring the biometric information, a process of reading the passport information, and a matching process are performed before an elapsed time from completion of the process in the first process reaches a predetermined time limit.

Supplementary Note 6

The program according to any one of supplementary notes 1 to 5, wherein in the second process, the passport information, the biometric information, and the boarding reservation information are transmitted to a server apparatus to be connected, and an identifier that associates the passport information, the biometric information, and the boarding reservation information with each other is issued.

Supplementary Note 7

The program according to any one of supplementary notes 1 to 6, wherein in the first process, the boarding reservation information is acquired based on a process of reading an airline ticket medium possessed by the user.

Supplementary Note 8

The program according to any one of supplementary notes 1 to 6, wherein in the first process, based on the passport information read in the second process, the boarding reservation information is acquired from a computer system managed by an airline company.

Supplementary Note 9

The program according to any one of supplementary notes 1 to 8, wherein the biometric information is any of a face image, an iris image, and a fingerprint image.

Supplementary Note 10

An information processing apparatus comprising:
a first processing unit that performs a predetermined process related to an aircraft boarding procedure and acquires boarding reservation information on a user;
a second processing unit that, when the process is completed, matches biometric information acquired from the user with passport biometric information included in passport information acquired from a passport of the user and, when a result of the matching of the biometric information with the passport biometric information is that the matching is successful, associates the passport information, the biometric information, and the boarding reservation information with each other; and
a switching unit that switches whether to perform the first processing unit or the second processing unit.

Supplementary Note 11

An information processing method comprising:
performing a first process for performing a predetermined process related to an aircraft boarding procedure and acquiring boarding reservation information on a user;
when the process is completed, performing a second process for matching biometric information acquired from the user with passport biometric information included in passport information acquired from a passport of the user and, when a result of the matching of the biometric information with the passport biometric information is that the matching is successful, associating the passport information, the biometric information, and the boarding reservation information with each other; and
performing a switching process for switching whether to perform the first process or the second process.

REFERENCE SIGNS LIST

NW1, NW2 network
1 information processing system
2 reservation system
10 management server
11 token ID information DB
12 passage history information DB
13 operation information DB
20 check-in terminal
23 airline application
24 token issuing application
30 automatic baggage check-in machine
40 security inspection apparatus
50 automated gate apparatus
60 boarding gate apparatus
100 information processing apparatus
100A first processing unit
100B second processing unit
100C switching unit

The invention claimed is:

1. A non-transitory computer-readable medium storing a program executable by a computer to perform processing comprising:
acquiring passport information on a user from a first terminal employed in a first procedure that a passenger performs regarding the boarding process;
acquiring a first biometric information on the user from the first terminal;
acquiring boarding reservation information on the user; and
issuing a token ID associated with the passport information, the biometric information, and the boarding reservation information, wherein the token ID is invalidated in a case in which the user boards an aircraft,
wherein the token ID after being issued, is identified by matching the second biometric information of the user acquired by a second terminal used for the second procedure related to the boarding process with the first biometric information, and
wherein the identified token ID is used to determine, based on the passport information and boarding reservation information associated with the token ID, whether the user can carry out the second procedure at the second terminal.

2. The non-transitory computer-readable medium according to claim 1, wherein the processing further comprises:
controlling an authentication process between the biometric information acquired from the user and passport biometric information included in the passport information.

3. The non-transitory computer-readable medium according to claim 2, wherein acquiring the boarding reservation information on the user, in a case in which the authentication process is completed, comprises acquiring the boarding reservation information via a server of an airline company based on the passport information, wherein the server stores the passport information of the user acquired at the time of reservation of a flight ticket in association with the boarding reservation information.

4. An information processing apparatus comprising:
a memory storing instructions; and
a processor configured to execute the instructions to:
acquire passport information on a user from a first terminal employed in a first procedure that a passenger performs regarding the boarding process;
acquire a first biometric information on the user from the first terminal;
acquire boarding reservation information on the user; and
issue a token ID associated with the passport information, the biometric information, and the boarding reservation information, wherein the token ID is invalidated in a case in which the user boards an aircraft,
wherein the token ID after being issued, is identified by matching the second biometric information of the user acquired by a second terminal used for the second procedure related to the boarding process with the first biometric information, and
wherein the identified token ID is used to determine, based on the passport information and boarding reservation information associated with the token ID, whether the user can carry out the second procedure at the second terminal.

5. The information processing apparatus according to claim 4, wherein the processor further executes the instructions to:
control an authentication process between the biometric information acquired from the user and passport biometric information included in the passport information.

6. The information processing apparatus according to claim 5, wherein the processor, acquires the boarding reservation information on the user, in a case in which the authentication process is completed, acquires the boarding reservation information via a server of an airline company based on the passport information, where the server stores the passport information of the user acquired at the time of reservation of a flight ticket in association with the boarding reservation information.

7. An information processing method performed by a computer and comprising:
acquiring passport information on a user from a first terminal employed in a first procedure that a passenger performs regarding the boarding process;
acquiring a first biometric information on the user from the first terminal;
acquiring boarding reservation information on the user; and issuing a token ID associated with the passport information, the biometric information, and the boarding reservation information, wherein the token ID is invalidated in a case in which the user boards an aircraft, wherein the token ID after being issued, is identified by matching the second biometric information of the user acquired by a second terminal used for the second procedure related to the boarding process with the first biometric information, and wherein the identified token ID is used to determine, based on the passport information and boarding reservation information associated with the token ID, whether the user can carry out the second procedure at the second terminal.

8. The information processing method according to claim 7, further comprising:

controlling an authentication process between the biometric information acquired from the user and passport biometric information included in the passport information.

9. The information processing method according to claim 8, wherein acquiring the boarding reservation information on the user, in a case in which the authentication process is completed, comprises acquiring the boarding reservation information via a server of an airline company based on the passport information, where the server stores the passport information of the user acquired at the time of reservation of a flight ticket in association with the boarding reservation information.

* * * * *